US010715360B2

(12) United States Patent
Li

(10) Patent No.: US 10,715,360 B2
(45) Date of Patent: Jul. 14, 2020

(54) DATA SCRAMBLING METHOD AND SCRAMBLING APPARATUS

(71) Applicant: Huawei Technologies Co., Ltd., Shenzhen (CN)

(72) Inventor: Changsong Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 87 days.

(21) Appl. No.: 15/991,477

(22) Filed: May 29, 2018

(65) Prior Publication Data

US 2018/0278443 A1    Sep. 27, 2018

Related U.S. Application Data

(63) Continuation of application No. PCT/CN2015/096032, filed on Nov. 30, 2015.

(51) Int. Cl.
H04L 25/03    (2006.01)
H04N 5/913    (2006.01)
(Continued)

(52) U.S. Cl.
CPC ........ H04L 25/03872 (2013.01); G06F 17/11 (2013.01); G06F 17/16 (2013.01);
(Continued)

(58) Field of Classification Search
CPC . H04L 25/03872; H04L 25/03; H04L 7/0337; H04L 25/03866; H04L 5/0064; G06F 17/11; G06F 17/16; H04N 5/913
See application file for complete search history.

(56) References Cited

U.S. PATENT DOCUMENTS 5,060,181 A * 10/1991 Matsuoka ............... G06F 17/10
                                                    708/270
6,519,738 B1 * 2/2003 Derby .................. H03M 13/091
                                                    714/757
(Continued)

FOREIGN PATENT DOCUMENTS

CN    101022283 A    8/2007
CN    101599811 A    12/2009
(Continued)

OTHER PUBLICATIONS

Reza Moradi Rad, et al., A Unified Data Embedding and Scrambling Method, Jan. 2014, IEEE Transactions on Image Processing, pp. 1-13.*

(Continued)

Primary Examiner — Farid Homayounmehr
Assistant Examiner — Raied A Salman
(74) Attorney, Agent, or Firm — Slater Matsil, LLP

(57) ABSTRACT

A data scrambling method and a scrambling apparatus, where the method includes a scrambling apparatus scrambling a data stream including a first data block and a second data block. The first data block and the second data block may belong to a same sub-data stream, or may belong to different sub-data streams. A specification of the data stream when the first data block and the second data block belong to a same sub-data stream is different from a specification of the data stream when the first data block and the second data block belong to different sub-data streams, and the scrambling apparatus can scramble data streams of different specifications.

16 Claims, 7 Drawing Sheets

(51) Int. Cl.
*G06F 17/11* (2006.01)
*G06F 17/16* (2006.01)
*H04L 7/033* (2006.01)

(52) U.S. Cl.
CPC ............ *H04L 7/0337* (2013.01); *H04L 25/03* (2013.01); *H04N 5/913* (2013.01)

(56) References Cited

U.S. PATENT DOCUMENTS

| | | | |
|---|---|---|---|
| 6,628,725 B1* | 9/2003 | Adam | H04L 1/004 341/60 |
| 10,390,333 B2* | 8/2019 | Djukic | H04L 1/0045 |
| 2008/0095218 A1 | 4/2008 | Murray et al. | |
| 2009/0103727 A1* | 4/2009 | Heywood | H04L 7/041 380/210 |
| 2011/0041039 A1* | 2/2011 | Harari | G06F 11/1068 714/773 |
| 2012/0213373 A1* | 8/2012 | Xin | H04L 9/002 380/287 |
| 2012/0294094 A1* | 11/2012 | Ling | G11C 7/1006 365/189.02 |
| 2014/0119336 A1 | 5/2014 | Liu et al. | |
| 2014/0161115 A1* | 6/2014 | Wang | H04L 25/03866 370/350 |
| 2016/0080842 A1 | 3/2016 | Ma et al. | |
| 2016/0315788 A1* | 10/2016 | Li | H04L 12/6418 |
| 2016/0315793 A1* | 10/2016 | Chen | H04L 5/0064 |
| 2018/0278443 A1* | 9/2018 | Li | G06F 17/11 |

FOREIGN PATENT DOCUMENTS

| | | |
|---|---|---|
| CN | 102869097 A | 1/2013 |
| CN | 103475452 A | 12/2013 |
| CN | 103745746 A | 4/2014 |
| CN | 104185094 A | 12/2014 |
| CN | 105009540 A | 10/2015 |
| WO | 2015100621 A1 | 7/2015 |
| WO | WO-2015100621 A1 * | 7/2015 |

OTHER PUBLICATIONS

C. Kraft, et al., Using the modulo inverse prefilter as a data scrambling device, Oct. 23-26, 1988, MILCOM 88, 21st Century Military Communications—What's Possible?. Conference record. Military Communications Conference, pp. 39-43.*

"Part 3: Carrier Sense Multiple Access with Collision Detection (CSMA/CD) Access Method and Physical Layer Specifications," IEEE Standard for Information Technology—Telecommunications and Information Exchange between Systems—Local and Metropolitan Area Networks—Specific Requirements, 802.3 Section Four, 2008, 586 pages.

Gustlin, M. et al., "MTTFPA Considerations for 40GE and 100GE," IEEE HSSG, Nov. 2017, 17 pages.

* cited by examiner

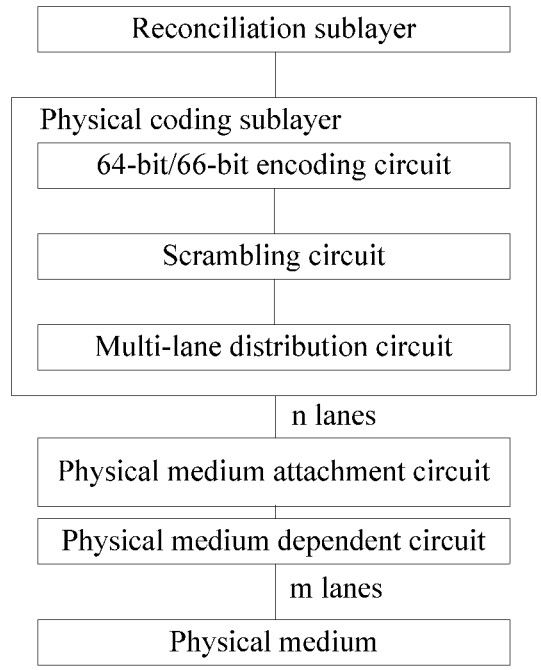
FIG. 3
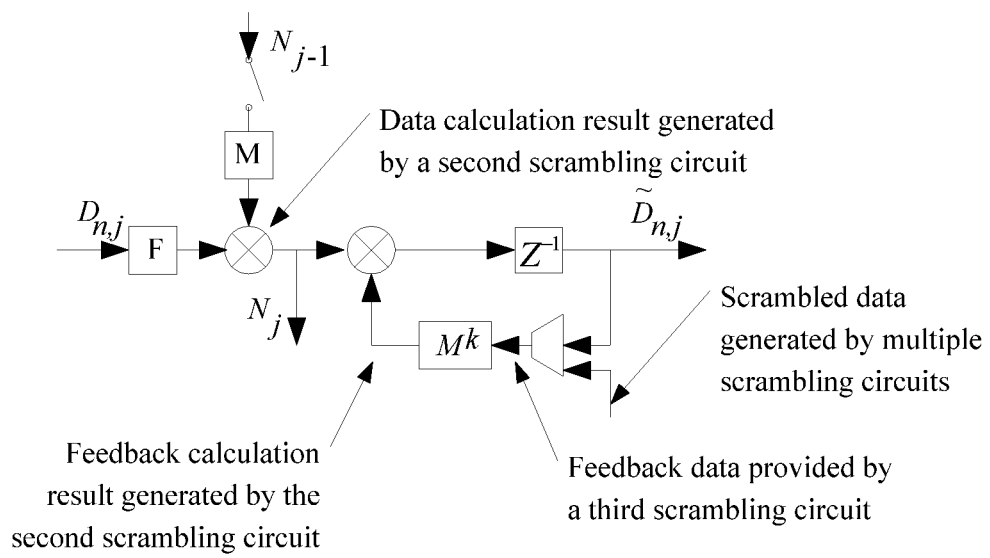
FIG. 4-a

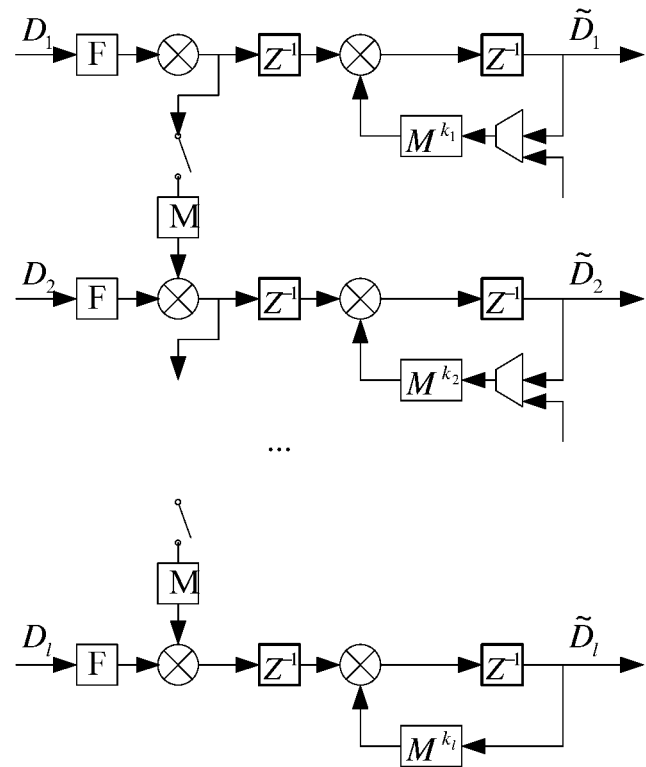
FIG. 4-b
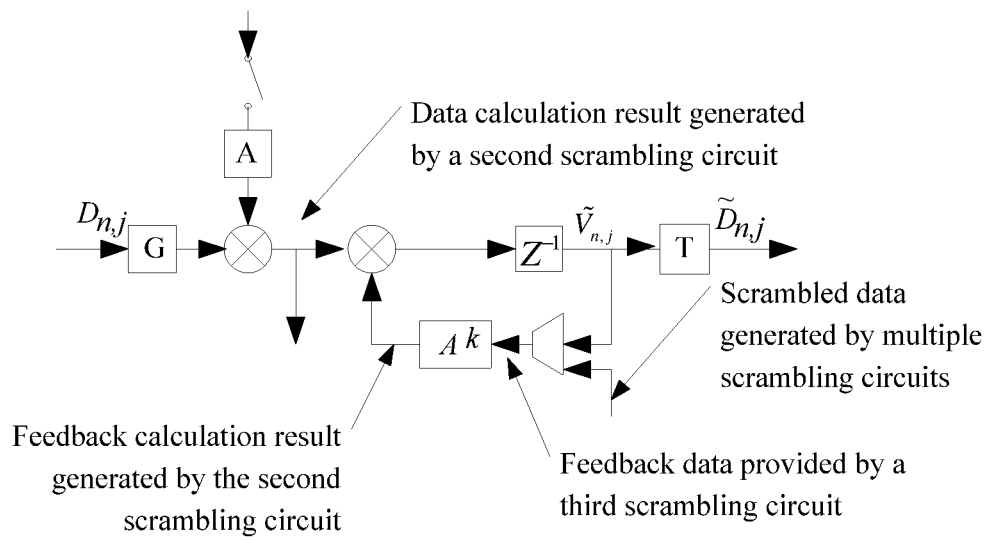
FIG. 5-a

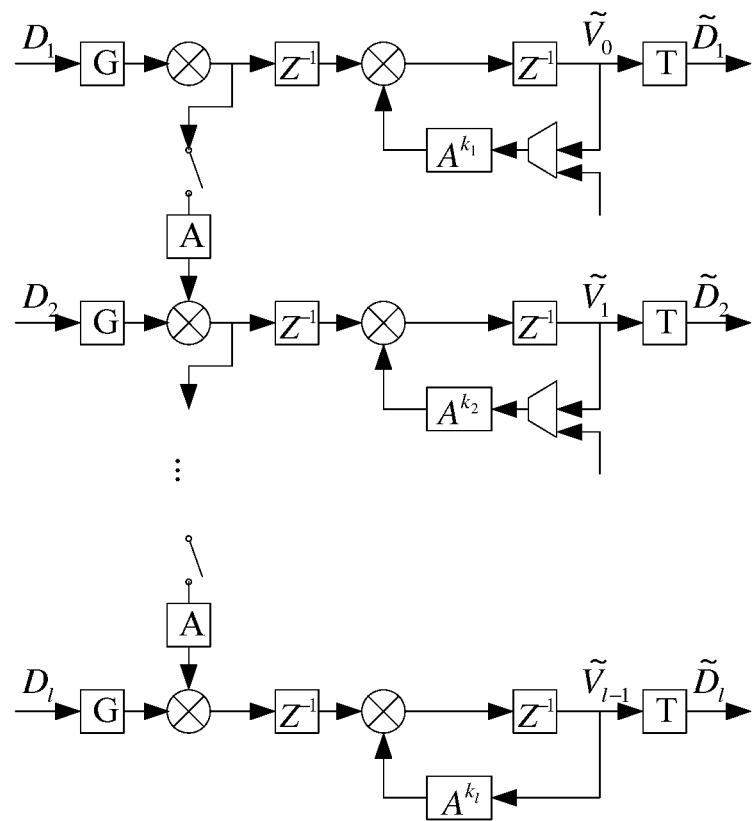
FIG. 5-b
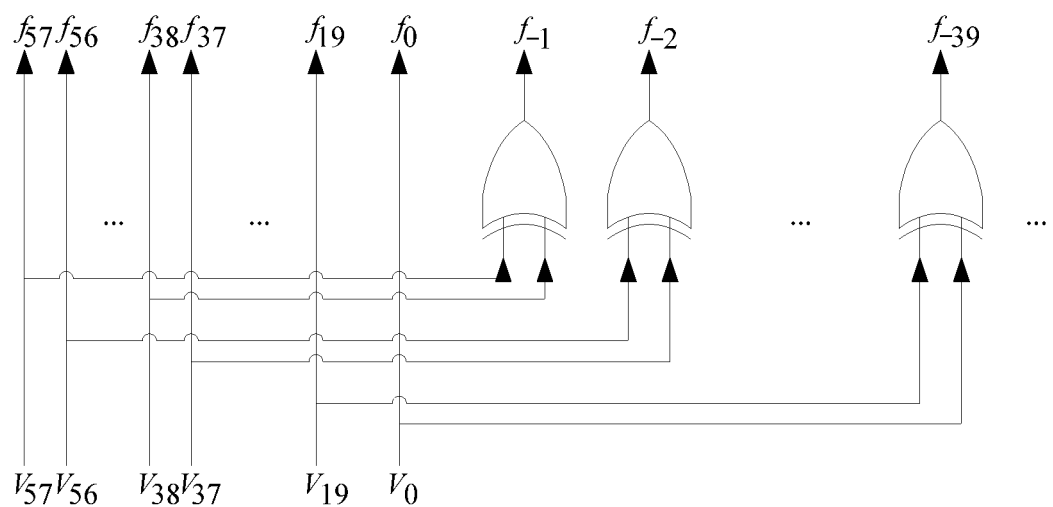
FIG. 6

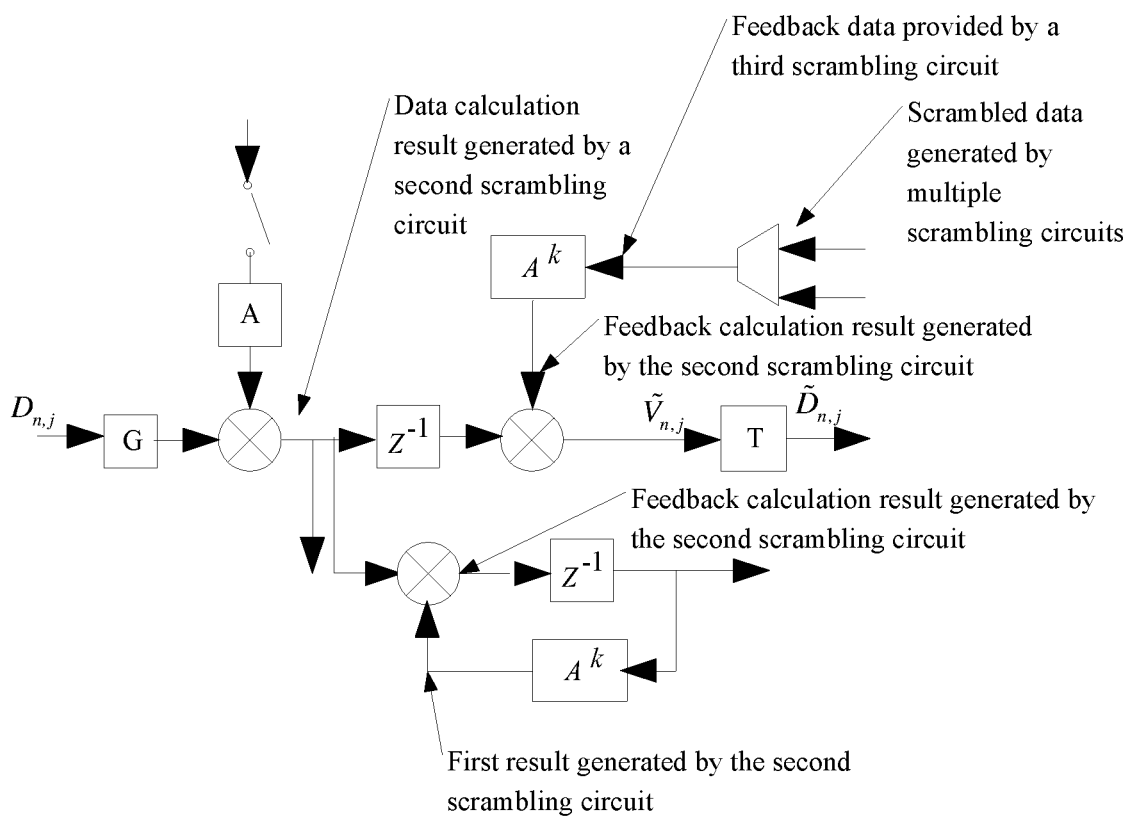
FIG. 7-a

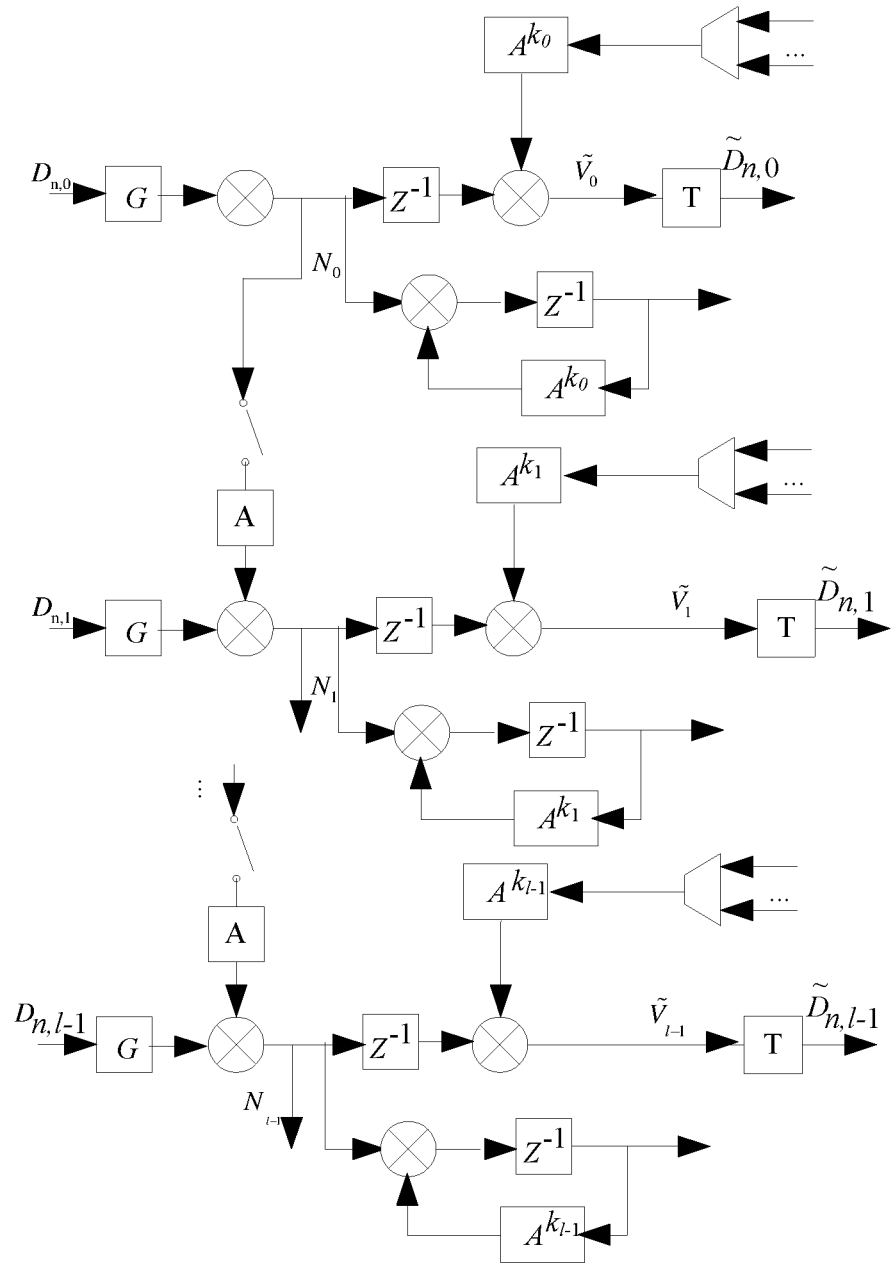
FIG. 7-b

DATA SCRAMBLING METHOD AND SCRAMBLING APPARATUS

CROSS-REFERENCE TO RELATED APPLICATIONS

This application is a continuation of International Application No. PCT/CN2015/096032, filed on Nov. 30, 2015, the disclosure of which is hereby incorporated by reference in its entirety.

TECHNICAL FIELD

Embodiments of the present invention relate to the communications field, and in particular, to a data scrambling method and a scrambling apparatus.

BACKGROUND

With the development of the Internet, a requirement on interface bandwidth of the Ethernet increases. The interface bandwidth of the Ethernet increases from 10 gigabits per second (Gigabit per second, Gpbs) to 100 Gbps, and evolves towards 400 Gbps and 1 terabit per second (terabit per second, Tbps). To improve channel utilization, a flexible grid optical transmission network (Flexible Grid Optical Transmission Network) technology emerges. An optical layer of an Ethernet interface can dynamically adjust a data sending rate according to a transmission distance of to-be-transmitted data and quality of a channel used to transmit the data. An interface standard of a network device may be 10 Gbps, 40 Gbps, or 100 Gbps. To implement interconnection, interfaces of two communication parties need to use interface standards that match each other. To reduce hardware costs, a design requirement that a transmitter or a receiver includes Ethernet interfaces of different interface standards exists. In the foregoing scenario, a variable-bandwidth interface needs to be used. A variable-bandwidth optical layer technology also requires that an electrical layer should include a variable-bandwidth interface.

In an Ethernet communication protocol, to ensure normal working of a clock and data recovery (Clock Data Recover, CDR) circuit, a scramble algorithm is generally used, so as to reduce a probability that successive 0s or successive 1s appear in transmitted serial data.

In the prior art, a scrambling apparatus can only scramble a data stream of a specification, and cannot scramble a data stream of another specification. A usage scenario of the scrambling apparatus is limited. For example, a requirement of a flexible Ethernet scenario cannot be well satisfied. For example, in the prior aft, if a scrambling apparatus is configured to scramble a data stream formed by two sub-data streams, the scrambling apparatus can only scramble a data stream formed by two sub-data streams, and cannot be configured to scramble a data stream formed by three sub-data streams, and cannot scramble a data stream including only one sub-data stream either.

SUMMARY

Embodiments of the present invention provide a data scrambling method and a scrambling apparatus, to scramble data streams of different specifications, which can help expand an application scenario of a scrambling apparatus.

According to a first aspect, an embodiment of the present invention provides a data scrambling method, where the method is executed by a scrambling apparatus, the scrambling apparatus includes multiple scrambling circuits, the multiple scrambling circuits include a first scrambling circuit and a second scrambling circuit, and the method includes performing, by the first scrambling circuit, data calculation on a first data block according to a first scrambling factor, to obtain a data calculation result generated by the first scrambling circuit, where the first scrambling factor is a scrambling factor determined by a scrambling polynomial, the first data block belongs to a first sub-data stream, and the first sub-data stream belongs to a data stream transmitted to the scrambling apparatus, performing, by the second scrambling circuit, data calculation on a second data block in the data stream and a first parameter according to the first scrambling factor, to obtain a data calculation result generated by the second scrambling circuit, where the second data block is a data block that is located after the first data block and that is adjacent to the first data block in the data stream during serial transmission, the second data block belongs to a second sub-data stream, the second sub-data stream belongs to the data stream, when the second sub-data stream and the first sub-data stream are a same sub-data stream, the first parameter is the data calculation result generated by the first scrambling circuit, and when the second sub-data stream and the first sub-data stream are two different sub-data streams, the first parameter is zero, performing, by the second scrambling circuit according to a second scrambling factor, feedback calculation on feedback data provided by a third scrambling circuit, to obtain a feedback calculation result generated by the second scrambling circuit, where the third scrambling circuit is a scrambling circuit among the multiple scrambling circuits, multiple data blocks in the second sub-data stream are obtained by the multiple scrambling circuits in one clock cycle, the last data block among the multiple data blocks in the second sub-data stream is obtained by the third scrambling circuit, the last data block is the last data block that is transmitted during serial transmission of the multiple data blocks, the second scrambling factor is a scrambling factor determined by the scrambling polynomial and a location of the second data block in the second sub-data stream, and the feedback data includes data that is obtained after scrambled data generated by the third scrambling circuit is registered for one clock cycle, or the feedback data includes a result that is obtained after exclusive OR calculation is performed on a first result and a data calculation result that is generated by the third scrambling circuit, where the first result is obtained after feedback calculation is performed on feedback data that is provided by the third scrambling circuit and that is registered for one clock cycle, and performing, by the second scrambling circuit, exclusive OR calculation on the data calculation result generated by the second scrambling circuit and the feedback calculation result generated by the second scrambling circuit, to obtain scrambled data generated by the second scrambling circuit, and outputting, by the second scrambling circuit, the scrambled data generated by the second scrambling circuit.

With reference to the first aspect, in a first possible implementation manner of the first aspect, the performing, by the second scrambling circuit, data calculation on a second data block in the data stream and a first parameter according to the first scrambling factor, to obtain a data calculation result generated by the second scrambling circuit includes multiplying, by the second scrambling circuit, a first scrambling parametric value in the first scrambling factor by the first parameter, to obtain a first multiplication result generated by the second scrambling circuit, multiplying, by the second scrambling circuit, a second scrambling parametric value in the first scrambling factor by the second data block, to obtain a second multiplication result generated by the second scrambling circuit, and performing, by the second scrambling circuit, exclusive OR calculation on the first multiplication result and the second multiplication result, to obtain the data calculation result generated by the second scrambling circuit.

With reference to the first aspect or the first possible implementation manner of the first aspect, in a second possible implementation manner of the first aspect, the performing, by the second scrambling circuit according to a second scrambling factor, feedback calculation on feedback data provided by a third scrambling circuit, to obtain a feedback calculation result generated by the second scrambling circuit includes performing, by the second scrambling circuit according to a constant matrix in the second scrambling factor and a power exponent of the constant matrix, exclusive OR calculation on the feedback data provided by the third scrambling circuit, to obtain an exclusive OR result generated by the second scrambling circuit, where the power exponent is determined according to the location of the second data block in the second sub-data stream, and performing, by the second scrambling circuit, a shift operation on the exclusive OR result according to the location of the second data block in the second sub-data stream, to obtain the feedback calculation result generated by the second scrambling circuit.

With reference to the first aspect, or the first or second possible implementation manner of the first aspect, in a third possible implementation manner of the first aspect, the performing, by the second scrambling circuit, data calculation on a second data block in the data stream and a first parameter according to the first scrambling factor, to obtain a data calculation result generated by the second scrambling circuit includes if each data block in the data stream has n bits, the second data block is the $j^{th}$ data block in the data stream, and the first data block is the $j-1^{th}$ data block in the data stream, $D_{n,j}'=M\times N_{j-1}+F\times D_{n,j}$, where $D_{n,j}'$ is the data calculation result generated by the second scrambling circuit, $D_{n,j}$ is the second data block, $N_{j-1}$ is the first parameter, M is the first scrambling parametric value in the first scrambling factor, and F is the second scrambling parametric value in the first scrambling factor, where $$N_{j-1} = \sum_{i=1}^{j-2} M^{j-1-i} \times F \times D_{n,i};$$

$$P_{next} = A \times P_{curr} + B \times d_i;$$

$$\tilde{d}_i = C \times P_{curr} + d_i,$$

where $P_{next}$ is a status value of a status register in the scrambling apparatus in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$H = \begin{bmatrix} CA^{n-1} \\ \vdots \\ CA \\ C \end{bmatrix}$$

-continued $$F = \begin{bmatrix} 1 & CB & CAB & \ldots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix}$$

and;

$M = H \times J,$ where J is an order-reversing calculation parametric value;

the performing, by the second scrambling circuit according to a second scrambling factor, feedback calculation on feedback data provided by a third scrambling circuit, to obtain a feedback calculation result generated by the second scrambling circuit includes $D_{n,j}'' = M^j \times \tilde{D}_{pre},$ where $D_{n,j}''$ is the feedback calculation result generated by the second scrambling circuit, $\tilde{D}_{pre}$ is the scrambled data generated by the third scrambling circuit, and $M^j$ is a third scrambling parametric value in the second scrambling factor, and the performing, by the second scrambling circuit, exclusive OR calculation on the data calculation result generated by the second scrambling circuit and the feedback calculation result generated by the second scrambling circuit, to obtain scrambled data generated by the second scrambling circuit includes $\tilde{D}_{n,j} = D_{n,j}'' + D_{n,j}'$, where $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

With reference to the first aspect, or the first or second possible implementation manner of the first aspect, in a fourth possible implementation manner of the first aspect, the performing, by the second scrambling circuit, data calculation on a second data block in the data stream and a first parameter according to the first scrambling factor, to obtain a data calculation result generated by the second scrambling circuit includes if each data block in the data stream has n bits, the second data block is the $j^{th}$ data block in the data stream, and the first data block is the $j-1^{th}$ data block in the data stream, $$V_{n,j}' = \sum_{i=1}^{j} A_n^{j-i} \times G \times D_{n,i},$$

where $V_{n,j}' = T^{-1} \times D_{n,j}'$, $D_{n,j}'$ is the data calculation result generated by the second scrambling circuit, $D_{n,i}$ is a data block in the second sub-data stream, $G = T^{-1} \times F$, and F is the second scrambling parametric value in the first scrambling factor;

$P_{next} = A \times P_{curr} + B \times d_i;$ $\tilde{d}_i = C \times P_{curr} + d_i,$ where $P_{next}$ is a status value of a status register in the scrambling apparatus in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$A_n = T^{-1} \times M \times T;$$

$$A_n = \begin{bmatrix} A_{m \times m} & O \\ O & O_{(n-m) \times (n-m)} \end{bmatrix}, M = \begin{bmatrix} M_m & O \\ M_t & O \end{bmatrix},$$

t satisfies the following relationship: t=n−m, m is an order of A, $$T = \begin{bmatrix} T_m & T_a \\ T_b & I_b \end{bmatrix},$$

$b=[1\ 0\ \ldots\ 0]^T$, $T_m=(W_m^{-1})^T$, $W_m=[b\ M_m^T \cdot b\ \ldots\ (M_m^T)^{m-1} \cdot b]$, $T_b=M_t \times M_m^{-1} \times T_m$, $T_a=O_{m \times b}$, $I_b$ is a $b^{th}$-order unit matrix, and $$H = \begin{bmatrix} CA^{n-1} \\ \vdots \\ CA \\ C \end{bmatrix}$$

$$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

and $M = H \times J,$ where J is an order-reversing calculation parametric value, the performing, by the second scrambling circuit according to a second scrambling factor, feedback calculation on feedback data provided by a third scrambling circuit, to obtain a feedback calculation result generated by the second scrambling circuit includes $V_{n,j}''=A_n^J \times \tilde{V}_{pre},$ where $V_{n,j}''=T^{-1} \times D_{n,j}''$, $D_{n,j}''$ is the feedback calculation result generated by the second scrambling circuit, $\tilde{V}_{pre}=T^{-1} \times \tilde{D}_{pre}$, $\tilde{D}_{pre}$ is the scrambled data generated by the third scrambling circuit, and $A_n^J$ is a fourth scrambling parametric value in the second scrambling factor, and the performing, by the second scrambling circuit, exclusive OR calculation on the data calculation result generated by the second scrambling circuit and the feedback calculation result generated by the second scrambling circuit, to obtain scrambled data generated by the second scrambling circuit includes $\tilde{V}_{n,j}=V_{n,j}''+V_{n,j}',$ where $\tilde{V}_{n,j}=T^{-1} \times \tilde{D}_{n,j}$, $V_{n,j}'=T^{-1} \times D_{n,j}'$, $V_{n,j}''=T^{-1} \times D_{n,j}''$, $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

According to a second aspect, an embodiment of the present invention provides a scrambling apparatus, where the scrambling apparatus includes multiple scrambling circuits, and the multiple scrambling circuits include a first scrambling circuit and a second scrambling circuit, where the first scrambling circuit is configured to perform data calculation on a first data block according to a first scrambling factor, to obtain a data calculation result generated by the first scrambling circuit, where the first scrambling factor is a scrambling factor determined by a scrambling polynomial, the first data block belongs to a first sub-data stream, and the first sub-data stream belongs to a data stream transmitted to the scrambling apparatus, and the second scrambling circuit is configured to perform performing data calculation on a second data block in the data stream and a first parameter according to the first scrambling factor, to obtain a data calculation result generated by the second scrambling circuit, where the second data block is a data block that is located after the first data block and that is adjacent to the first data block in the data stream during serial transmission, the second data block belongs to a second sub-data stream, the second sub-data stream belongs to the data stream, when the second sub-data stream and the first sub-data stream are a same sub-data stream, the first parameter is the data calculation result generated by the first scrambling circuit, and when the second sub-data stream and the first sub-data stream are two different sub-data streams, the first parameter is zero, performing, according to a second scrambling factor, feedback calculation on feedback data provided by a third scrambling circuit, to obtain a feedback calculation result generated by the second scrambling circuit, where the third scrambling circuit is a scrambling circuit among the multiple scrambling circuits, multiple data blocks in the second sub-data stream are obtained by the multiple scrambling circuits in one clock cycle, the last data block among the multiple data blocks in the second sub-data stream is obtained by the third scrambling circuit, the last data block is the last data block that is transmitted during serial transmission of the multiple data blocks, the second scrambling factor is a scrambling factor determined by the scrambling polynomial and a location of the second data block in the second sub-data stream, and the feedback data includes data that is obtained after scrambled data generated by the third scrambling circuit is registered for one clock cycle, or the feedback data includes a result that is obtained after exclusive OR calculation is performed on a first result and a data calculation result that is generated by the third scrambling circuit, where the first result is obtained after feedback calculation is performed on feedback data that is provided by the third scrambling circuit and that is registered for one clock cycle, performing exclusive OR calculation on the data calculation result generated by the second scrambling circuit and the feedback calculation result generated by the second scrambling circuit, to obtain scrambled data generated by the second scrambling circuit, and outputting the scrambled data generated by the second scrambling circuit.

With reference to the second aspect, in a first possible implementation manner of the second aspect, the second scrambling circuit is specifically configured to perform multiplying a first scrambling parametric value in the first scrambling factor by the first parameter, to obtain a first multiplication result generated by the second scrambling circuit, multiplying a second scrambling parametric value in the first scrambling factor by the second data block, to obtain a second multiplication result generated by the second scrambling circuit, and performing exclusive OR calculation on the first multiplication result and the second multiplication result, to obtain the data calculation result generated by the second scrambling circuit.

With reference to the second aspect or the first possible implementation manner of the second aspect, in a second possible implementation manner of the second aspect, the second scrambling circuit is specifically configured to perform performing, according to a constant matrix in the second scrambling factor and a power exponent of the constant matrix, exclusive OR calculation on the feedback data provided by the third scrambling circuit, to obtain an exclusive OR result generated by the second scrambling circuit, where the power exponent is determined according to the location of the second data block in the second sub-data stream, and performing a shift operation on the exclusive OR result according to the location of the second data block in the second sub-data stream, to obtain the feedback calculation result generated by the second scrambling circuit.

With reference to the second aspect, or the first or second possible implementation manner of the second aspect, in a third possible implementation manner of the second aspect, the second scrambling circuit is specifically configured to perform if each data block in the data stream has n bits, the second data block is the $j^{th}$ data block in the data stream, and the first data block is the $j-1^{th}$ data block in the data stream, $$D_{n,j}' = M \times N_{j-1} + F \times D_{n,j},$$

where $D_{n,j}'$ is the data calculation result generated by the second scrambling circuit, $D_{n,j}$ is the second data block, $N_{j-1}$ is the first parameter, M is the first scrambling parametric value in the first scrambling factor, and F is the second scrambling parametric value in the first scrambling factor, where $$N_{j-1} = \sum_{i=1}^{j-2} M^{j-1-i} \times F \times D_{n,i};$$

$$P_{next} = A \times P_{curr} + B \times d_i;$$

$$\tilde{d}_i = C \times P_{curr} + d_i,$$

where $P_{next}$ is a status value of a status register in the scrambling apparatus in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$H = \begin{bmatrix} CA^{n-1} \\ \vdots \\ CA \\ C \end{bmatrix};$$

$$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

$M = H \times J,$ where J is an order-reversing calculation parametric value;

$$D_{n,j}'' = M^j \times \tilde{D}_{pre},$$

where $D_{n,j}''$ is the feedback calculation result generated by the second scrambling circuit, $\tilde{D}_{pre}$ is the scrambled data generated by the third scrambling circuit, and $M^j$ is a third scrambling parametric value in the second scrambling factor, feedback calculation is performed, in the following manner, on the feedback data generated by the third scrambling circuit:

$$D_{n,j}'' = M^j \times \tilde{D}_{pre},$$

where $D_{n,j}''$ is the feedback calculation result generated by the second scrambling circuit, $\tilde{D}_{pre}$ is the scrambled data generated by the third scrambling circuit, and $M^j$ is a third scrambling parametric value in the second scrambling factor, and exclusive OR calculation is performed, in the following manner, on the data calculation result generated by the second scrambling circuit and the feedback calculation result generated by the second scrambling circuit:

$$\tilde{D}_{n,j} = D_{n,j}'' + D_{n,j}',$$

where $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

With reference to the second aspect, or the first or second possible implementation manner of the second aspect, in a fourth possible implementation manner of the second aspect, the second scrambling circuit is specifically configured to perform if each data block in the data stream has n bits, the second data block is the $j^{th}$ data block in the data stream, and the first data block is the $j-1^{th}$ data block in the data stream, $$V_{n,j}' = \sum_{i=1}^{j} A_n^{j-1} \times G \times D_{n,i},$$

where $V_{n,j}' = T^{-1} \times D_{n,j}'$, $D_{n,j}'$ is the data calculation result generated by the second scrambling circuit, $D_{n,j}$ is a data block in the second sub-data stream, $G = T^{-1} \times F$ and F is the second scrambling parametric value in the first scrambling factor;

$$P_{next} = A \times P_{curr} + B \times d_i;$$

$$\tilde{d}_i = C \times P_{curr} \pm d_i,$$

where $P_{next}$ is a status value of a status register in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$A_n = T^{-1} \times M \times T;$$

$$A_n = \begin{bmatrix} A_{m \times m} & O \\ O & O_{(n-m) \times (n-m)} \end{bmatrix}, M = \begin{bmatrix} M_m & O \\ M_t & O \end{bmatrix},$$

t satisfies the following relationship: $t = n - m$, m is an order of A, $$T = \begin{bmatrix} T_m & T_a \\ T_b & I_b \end{bmatrix},$$

$b = [1 \, 0 \ldots 0]^T$, $T_m = (W_m^{-1})^T$, $W_m = [b \, M_m^T \cdot b \ldots (M_m^T)^{m-1} \cdot b]$, $T_b = M_t \times M_m^{-1} \times T_m$, $T_a = O_{m \times b}$, $I_b$ is a $b^{th}$-order unit matrix, and $$H = \begin{bmatrix} CA^{n-1} \\ \vdots \\ CA \\ C \end{bmatrix};$$

$$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

$M = H \times J$, where J is an order-reversing calculation parametric value, $V_{n,j}'' = A_n^j \times \tilde{V}_{pre}$, where $V_{n,j}'' = T^{-1} \times D_{n,j}''$, $D_{n,j}''$ is the feedback calculation result generated by the second scrambling circuit, $\tilde{V}_{pre} = T^{-1} \times \tilde{D}_{pre}$, $\tilde{D}_{pre}$ is the scrambled data generated by the third scrambling circuit, and $A_n^j$ is a fourth scrambling parametric value in the second scrambling factor, and the performing, by the second scrambling circuit, exclusive OR calculation on the data calculation result generated by the second scrambling circuit and the feedback calculation result generated by the second scrambling circuit, to obtain scrambled data generated by the second scrambling circuit includes $\tilde{V}_{n,j} = V_{n,j}'' + V_{n,j}'$, where $\tilde{V}_{n,j} = T^{-1} \times \tilde{D}_{n,j}$, $V_{n,j}' = T^{-1} \times D_{n,j}'$, $V_{n,j}'' = T^{-1} \times D_{n,j}''$, $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

Optionally, in the first aspect, the first to fourth possible implementation manners of the first aspect, the second aspect, and the first to fourth possible implementation manners of the second aspect, different sub-data streams in the data stream may be differentiated according to different destination devices to which the sub-data streams need to be sent. All data blocks included in a same sub-data stream need to be sent to a same destination device. A sub-data stream may include one or more data blocks.

Optionally, in the first aspect, the first to fourth possible implementation manners of the first aspect, the second aspect, and the first to fourth possible implementation manners of the second aspect, when the first scrambling circuit performs data calculation on the first data block, the first scrambling factor determined by the scrambling polynomial may refer to one or more scrambling parametric values that need to be used during the data calculation. The data calculation performed by the first scrambling circuit refers to a manner for calculating a to-be-scrambled data block (for example, the first data block). During the data calculation, the to-be-scrambled data block needs to be used, and the feedback data and the feedback calculation result do not need to be used.

Optionally, in the first aspect, the first to fourth possible implementation manners of the first aspect, the second aspect, and the first to fourth possible implementation manners of the second aspect, when the second scrambling circuit performs data calculation on the second data block, the first scrambling factor determined by the scrambling polynomial may refer to one or more scrambling parametric values that need to be used during the data calculation. The data calculation performed by the second scrambling circuit refers to a manner for calculating a to-be-scrambled data block (for example, the second data block). During the data calculation, the to-be-scrambled data block needs to be used, and the feedback data and the feedback calculation result do not need to be used.

Optionally, in the first aspect, the first to fourth possible implementation manners of the first aspect, the second aspect, and the first to fourth possible implementation manners of the second aspect, the adjacent first data block and second data block included in the data stream may belong to different sub-data streams, or the first data block and second data block may belong to a same sub-data stream. Whether the first data block and the second data block belong to a same sub-data stream may be specifically determined according to whether the first data block and the second data block are sent to a same destination device. A sub-data stream may include one or more data blocks.

Optionally, in the first aspect, the first to fourth possible implementation manners of the first aspect, the second aspect, and the first to fourth possible implementation manners of the second aspect, a scrambling circuit configured to process the last data block among the multiple data blocks included in the second sub-data stream is defined as the third scrambling circuit. When the second sub-data stream includes only the second data block, the third scrambling circuit and the second scrambling circuit refer to a same scrambling circuit. The feedback data provided by the third scrambling circuit may have two implementation manners. One implementation manner is that the feedback data includes data that is obtained after scrambled data generated by the third scrambling circuit is registered for one clock cycle. The other implementation manner is that the feedback data includes a result that is obtained after exclusive OR calculation is performed on a first result and a data calculation result that is generated by the third scrambling circuit, where the first result is obtained after feedback calculation is performed on feedback data that is provided by the third scrambling circuit and that is registered for one clock cycle.

Optionally, in the first aspect, the first to fourth possible implementation manners of the first aspect, the second aspect, and the first to fourth possible implementation manners of the second aspect, a specific form of expression of the second scrambling factor that is used for the feedback calculation and that is determined by the scrambling polynomial may be a constant matrix and a power exponent of the constant matrix. In this case, the feedback calculation may be implemented by performing, by using a power exponent of a constant matrix, exclusive OR calculation on the feedback data provided by the third scrambling circuit.

As can be seen from the foregoing technical solutions, the embodiments of the present invention have the following advantages:

In the foregoing technical solutions, a scrambling apparatus may scramble a data stream including a first data block and a second data block. The first data block and the second data block may belong to a same sub-data stream, or may belong to different sub-data streams. A specification of the data stream when the first data block and the second data block belong to a same sub-data stream is different from a specification of the data stream when the first data block and the second data block belong to different sub-data streams. Therefore, the scrambling apparatus can scramble data streams of different specifications. The foregoing technical solutions provided in the embodiments of the present invention expand an application scenario of a scrambling apparatus.

BRIEF DESCRIPTION OF THE DRAWINGS

FIG. 3 is a schematic diagram of a location at which scrambling processing is performed in an Ethernet interface according to an embodiment of the present invention;

FIG. 4-a is a schematic diagram of a circuit performing scrambling processing on a data block according to an embodiment of the present invention;

FIG. 4-b is a schematic structural diagram of a scrambling apparatus performing parallel scrambling processing on 1 data blocks;

FIG. 5-a is a schematic diagram of another circuit performing scrambling processing on a data block according to an embodiment of the present invention;

FIG. 5-b is a schematic structural diagram of another scrambling apparatus performing parallel scrambling processing on 1 data blocks;

FIG. 6 is a schematic diagram of a circuit for exclusive OR calculation in power multiplication calculation according to an embodiment of the present invention;

FIG. 7-a is a schematic diagram of another circuit performing scrambling processing on a data block according to an embodiment of the present invention;

FIG. 7-b is a schematic structural diagram of another scrambling apparatus performing parallel scrambling processing on 1 data blocks.

DETAILED DESCRIPTION OF ILLUSTRATIVE EMBODIMENTS

Embodiments of the present invention provide a data scrambling method and a scrambling apparatus, to scramble data streams of multiple different specifications, which can help expand an application scenario of a scrambling apparatus.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely a part rather than all of the embodiments of the present invention. Persons skilled in the art can obtain other embodiments based on the embodiments provided in this application.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention.

Detailed descriptions are separately provided in the following.

Figure 1:
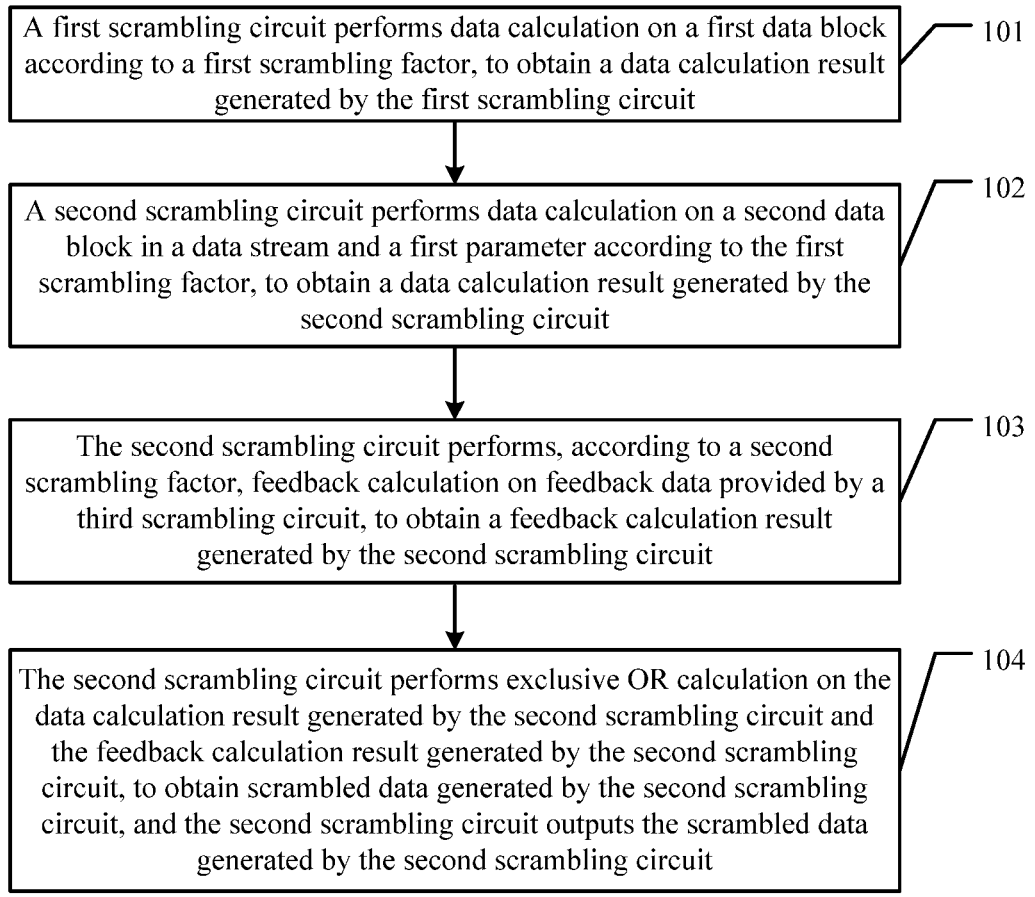
FIG. 1 is a schematic flowchart of a data scrambling method according to an embodiment of the present invention.

In an embodiment of a data scrambling method of the present invention, the data scrambling method is executed by a scrambling apparatus, and the method may be applicable to scrambling processing performed by the scrambling apparatus on multiple data blocks in a data stream. The scrambling apparatus includes multiple scrambling circuits. The multiple scrambling circuits include a first scrambling circuit and a second scrambling circuit. Referring to FIG. 1, a data scrambling method provided in an embodiment of the present invention may include the following steps.

101: The first scrambling circuit performs data calculation on a first data block according to a first scrambling factor, to obtain a data calculation result generated by the first scrambling circuit.

The first scrambling factor is a scrambling factor determined by a scrambling polynomial, the first data block belongs to a first sub-data stream, and the first sub-data stream belongs to a data stream transmitted to the scrambling apparatus.

This embodiment of the present invention may be used in a scenario of a CDR circuit. Specifically, data received by the CDR circuit needs to have randomness. A requirement of the CDR circuit on data is that 0s and is in the data are balanced and a probability of appearance of successive 0s and successive 1s is reduced as much as possible. After data is encoded, encoded data may be scrambled, to implement randomness of the data. For example, in a 100 Gbps Ethernet standard, after 64b/66b encoding is performed on data, encoded data needs to be scrambled. Certainly, another encoding manner may be used to encode data, which is not limited in this embodiment of the present invention.

In this embodiment of the present invention, an encoded data stream is scrambled. The scrambling apparatus obtains the foregoing encoded data stream. The data stream includes at least one sub-data stream. Different sub-data streams in the data stream may be differentiated according to different destination devices to which the sub-data streams need to be sent. All data blocks included in a same sub-data stream need to be sent to a same destination device. A sub-data stream may include one or more data blocks. An inclusion relationship between a sub-data stream and a data block can be flexibly configured, and a quantity of sub-data streams included in a data stream can also be flexibly configured. When a quantity of data blocks included in a sub-data stream in a data stream 1 is different from a quantity of data blocks included in a sub-data stream in a data stream 2, the data stream 1 and the data stream 2 are data streams of different specifications. Alternatively, when a quantity of sub-data streams included in a data stream 1 is different from a quantity of sub-data streams included in a data stream 2, the data stream 1 and the data stream 2 are data streams of different specifications. Each data stream in this embodiment of the present invention includes multiple data blocks. Next, scrambling processing of any two adjacent data blocks (separately referred to as a first data block and a second data block) in the data stream is described.

A sub-data stream in which the first data block is located is defined as a first sub-data stream. The first sub-data stream belongs to a data stream transmitted to the scrambling apparatus. All data blocks included in the first sub-data stream are sent to a same destination device. A sub-data stream in which the second data block is located is defined as a second sub-data stream. The second sub-data stream belongs to the data stream transmitted to the scrambling apparatus. All data blocks included in the second sub-data stream are sent to a same destination device. The first sub-data stream in which the first data block is located and the second sub-data stream in which the second data block is located may be a same sub-data stream, or the first sub-data stream in which the first data block is located and the second sub-data stream in which the second data block is located may be two different sub-data streams. In addition, that the first data block and the second data block are two adjacent data blocks refers to that locations of the first data block and the second data block in the data stream are adjacent to each other during serial transmission of the data stream, and the second data block is located after the first data block in the data stream. A time at which the second data block is transmitted is later than a time at which the first data block is transmitted. In all the following embodiments of the present invention, scrambling processing of the second data block is described in detail. Scrambling processing of other data blocks included in the data stream transmitted to the scrambling apparatus may also be implemented with reference to the scrambling processing of the second data block in this embodiment of the present invention. Scrambling processing processes of the other data blocks are all similar to a scrambling processing process of the second data block, and the scrambling processing of the other data blocks is not described in detail herein one by one.

In this embodiment of the present invention, after the first scrambling circuit in the scrambling apparatus obtains the to-be-scrambled first data block, the first scrambling circuit obtains the first scrambling factor determined by the scrambling polynomial. The scrambling polynomial may be determined by a scramble algorithm implemented by the scrambling apparatus. A 100 Gbps Ethernet interface standard is used as an example for description. The 100 Gbps Ethernet interface standard uses self-synchronous scrambling. A scrambling polynomial defined in the Institute of Electrical and Electronics Engineers (Institute of Electrical and Electronics Engineers, IEEE) 802.3 standard is $G(x)=1+x^{39}+x^{58}$. In step 101, when the first scrambling circuit performs data calculation on the first data block, the first scrambling factor determined by the scrambling polynomial may refer to one or more scrambling parametric values that need to be used during the data calculation. The first scrambling factor determined by the scrambling polynomial has multiple specific implementation forms, and may have different forms of expression corresponding to different values of the scrambling polynomial. In addition, both a specific form and a value result of a scrambling parametric value included in the first scrambling factor need to be implemented with reference to a specific scenario. The data calculation performed by the first scrambling circuit refers to a manner for calculating a to-be-scrambled data block (for example, the first data block). During the data calculation, the to-be-scrambled data block needs to be used, and feedback data and a feedback calculation result described in the following embodiments do not need to be used. A specific process of the data calculation and a specific value of the first scrambling factor are implemented in different manners in different application scenarios, which is not limited herein. For ease of description in the following embodiments, a result obtained after the first scrambling circuit performs data calculation in step 101 is defined as the data calculation result generated by the first scrambling circuit.

It should be noted that, in step 101, the first scrambling circuit performs data calculation on the first data block input to the first scrambling circuit in the data stream. The data calculation described herein requires the use of the first scrambling factor. If the first data block is the first data block in the first sub-data stream (which herein refers to that the first data block is the first data block in the sub-data stream in terms of location), the first scrambling circuit can obtain, by using only the first scrambling factor, the data calculation result generated by the first scrambling circuit. If the first data block is not the first data block in the first sub-data stream, the first scrambling circuit further needs to use a data calculation result that is generated after data calculation is performed on a previous data block of the first data block. After the first scrambling circuit performs data calculation on the first data block, the first scrambling circuit further needs to transfer the data calculation result generated by the first scrambling circuit to a scrambling circuit configured to process a next data block of the first data block. After obtaining the data calculation result, the first scrambling circuit further needs to transfer the data calculation result to the scrambling circuit configured to process the next data block of the first data block, so that the data calculation result is used for data calculation performed by the scrambling circuit configured to process the next data block of the first data block. Pipeline operations are implemented between the multiple scrambling circuits in the scrambling apparatus. By means of transfer of data calculation results between the scrambling circuits, an objective of quick calculation can be achieved, so as to save logical computing resources. The first data block and the next data block of the first data block are adjacent data blocks.

When performing data calculation, the first scrambling circuit uses the first scrambling factor determined by the scrambling polynomial. The use of the first scrambling factor by the first scrambling circuit may refer to direct use of the foregoing first scrambling factor, or the use of the first scrambling factor by the first scrambling circuit refers to use of a scrambling factor that is obtained by performing transformation according to the first scrambling factor after the first scrambling factor is determined. Specific parameter content of the first scrambling factor in this embodiment of the present invention needs to be determined with reference to a specific protocol followed by data transmission, a scramble algorithm, and a specific bandwidth standard that is involved in a transmission network, which is described in the following embodiments by using examples.

102: The second scrambling circuit performs data calculation on a second data block in the data stream and a first parameter according to the first scrambling factor, to obtain a data calculation result generated by the second scrambling circuit.

The second data block is a data block that is located after the first data block and that is adjacent to the first data block in the data stream during serial transmission. The second data block belongs to a second sub-data stream, and the second sub-data stream belongs to the data stream. When the second sub-data stream and the first sub-data stream are a same sub-data stream, the first parameter is the data calculation result generated by the first scrambling circuit, and when the second sub-data stream and the first sub-data stream are two different sub-data streams, the first parameter is zero.

In this embodiment of the present invention, among the multiple scrambling circuits included in the scrambling apparatus, the first scrambling circuit and the second scrambling circuit perform scrambling processing in parallel in a same clock cycle. The second scrambling circuit is a scrambling circuit configured to perform scrambling processing on the second data block. As can be known from the above-described relationship between the first data block and the second data block, the first data block and the second data block are two adjacent data blocks in the data stream; therefore, the first scrambling circuit and the second scrambling circuit are two adjacent scrambling circuits in the scrambling apparatus. The two scrambling circuits may be connected by using a switch. When the second sub-data stream and the first sub-data stream are a same sub-data stream, that is, the first data block and the second data block are from a same sub-data stream, the switch is turned on. The data calculation result generated by the first scrambling circuit may be transferred to the second scrambling circuit by using the switch. The first parameter used by the second scrambling circuit to perform data calculation on the second data block is the data calculation result generated by the first scrambling circuit. When the second sub-data stream and the first sub-data stream are two different sub-data streams, the switch is turned off. The second scrambling circuit does not need to use the data calculation result transferred by the first scrambling circuit. In this case, the first parameter used by the second scrambling circuit to perform data calculation on the second data block is zero.

In this embodiment of the present invention, after the second scrambling circuit in the scrambling apparatus obtains the to-be-scrambled second data block, the second scrambling circuit obtains the first scrambling factor determined by the scrambling polynomial. The scrambling polynomial may be determined by a scramble algorithm implemented by the scrambling apparatus, for example, the scrambling polynomial may be $G(x)=1+x^{39}+x^{58}$. In step 102, when the second scrambling circuit performs data calculation on the second data block, the first scrambling factor determined by the scrambling polynomial may refer to one or more scrambling parametric values that need to be used during the data calculation. The first scrambling factor determined by the scrambling polynomial has multiple specific implementation forms, and may have different forms of expression corresponding to different values of the scrambling polynomial. In addition, both a specific form and a value result of a scrambling parametric value included in the first scrambling factor need to be implemented with reference to a specific scenario. The data calculation performed by the second scrambling circuit refers to a manner for calculating a to-be-scrambled data block (for example, the second data block). During the data calculation, the to-be-scrambled data block needs to be used, and feedback data and a feedback calculation result described in the following embodiments do not need to be used. A specific process of the data calculation and a specific value of the first scrambling factor are implemented in different specific manners in different application scenarios, which is not limited herein. For ease of description in the following embodiments, a result obtained after the second scrambling circuit performs data calculation in step 102 is defined as the data calculation result generated by the second scrambling circuit.

In this embodiment of the present invention, the adjacent first data block and second data block included in the data stream may belong to different sub-data streams, or the first data block and second data block may belong to a same sub-data stream. Whether the first data block and the second data block belong to a same sub-data stream may be specifically determined according to whether the first data block and the second data block are sent to a same destination device. A sub-data stream may include one or more data blocks. An inclusion relationship between a sub-data stream and a data block can be flexibly configured. The data calculation performed by the second scrambling circuit on the second data block specifically includes if the first data block and the second data block belong to a same sub-data stream, the second scrambling circuit needs to use the data calculation result generated by the first scrambling circuit; if the first data block and the second data block belong to two different sub-data streams, the second data block is the first data block in the second sub-data stream, and a value of the first parameter is zero. In this embodiment of the present invention, that the value of the first parameter is zero means that the second scrambling circuit can also complete data calculation on the second data block without using the first parameter.

In some embodiments of the present invention, step 102, that is, the second scrambling circuit performs data calculation on a second data block in the data stream and a first parameter according to the first scrambling factor, to obtain a data calculation result generated by the second scrambling circuit may include the following steps:

A1: The second scrambling circuit multiplies a first scrambling parametric value in the first scrambling factor by the first parameter, to obtain a first multiplication result generated by the second scrambling circuit.

A2: The second scrambling circuit multiplies a second scrambling parametric value in the first scrambling factor by the second data block, to obtain a second multiplication result generated by the second scrambling circuit.

A3: The second scrambling circuit performs exclusive OR calculation on the first multiplication result and the second multiplication result, to obtain the data calculation result generated by the second scrambling circuit.

The first scrambling factor determined by the scrambling polynomial may include the first scrambling parametric value and the second scrambling parametric value. Specific implementation of the first scrambling parametric value and the second scrambling parametric value is related to a protocol followed by data transmission, a scramble algorithm, and a specific bandwidth standard that is involved in a transmission network, and may be determined according to a specific application scenario. The data calculation performed by the second scrambling circuit on the second data block may be implemented in the following manner: first calculating the first multiplication result and the second multiplication result, and then performing exclusive OR calculation on the first multiplication result and the second multiplication result, to obtain the data calculation result generated by the second scrambling circuit.

It should be noted that, in this embodiment of the present invention, data calculation may refer to GF field calculation based on the scrambling polynomial $G(x)=1+x^{39}+x^{58}$; certainly, data calculation may be based on another scrambling polynomial. Values of scrambling factors corresponding to different polynomials are different. In addition, in step 102, the first scrambling factor that is determined by the scrambling polynomial and that is used by the second scrambling circuit to perform data calculation on the second data block is related to a data protocol followed by data transmission, a scramble algorithm, and a specific bandwidth standard that is involved in a transmission network, and a specific value or a specific transformation of the first scrambling factor may be determined with reference to a specific application scenario.

103: The second scrambling circuit performs, according to a second scrambling factor, feedback calculation on feedback data provided by a third scrambling circuit, to obtain a feedback calculation result generated by the second scrambling circuit.

The third scrambling circuit is a scrambling circuit among the multiple scrambling circuits. Multiple data blocks in the second sub-data stream are obtained by the multiple scrambling circuits in one clock cycle. The last data block among the multiple data blocks in the second sub-data stream is obtained by the third scrambling circuit, and the last data block is the last data block that is transmitted during serial transmission of the multiple data blocks. The second scrambling factor is a scrambling factor determined by the scrambling polynomial and a location of the second data block in the second sub-data stream. The feedback data includes data that is obtained after scrambled data generated by the third scrambling circuit is registered for one clock cycle, or the feedback data includes a result that is obtained after exclusive OR calculation is performed on a first result and a data calculation result that is generated by the third scrambling circuit, where the first result is obtained after feedback calculation is performed on feedback data that is provided by the third scrambling circuit and that is registered for one clock cycle.

In this embodiment of the present invention, the second sub-data stream in which the second data block is located may include multiple data blocks. The multiple scrambling circuits in the scrambling apparatus may respectively perform scrambling processing on the multiple data blocks included in the second sub-data stream. The multiple scrambling circuits may respectively generate multiple pieces of scrambled data. A scrambling circuit that already completes scrambling may output scrambled data. As described in step 102, the second scrambling circuit performs data calculation on the second data block, to obtain the data calculation result generated by the second scrambling circuit. Then the second scrambling circuit further needs to perform step 103, that is, the second scrambling circuit performs, according to the second scrambling factor, feedback calculation on the feedback data provided by the third scrambling circuit, to obtain the feedback calculation result generated by the second scrambling circuit. In addition to the second data block, the second sub-data stream may further include multiple data blocks. The multiple scrambling circuits in the scrambling apparatus simultaneously perform scrambling processing on all the data blocks included in the second sub-data stream. Each scrambling circuit performs scrambling processing on one data block in the second sub-data stream. After performing scrambling processing, each scrambling circuit outputs scrambled data. A scrambling circuit configured to process the last data block among the multiple data blocks included in the second sub-data stream is defined as the third scrambling circuit. When the second sub-data stream includes only the second data block, the third scrambling circuit and the second scrambling circuit refer to a same scrambling circuit. The feedback data provided by the third scrambling circuit may have two implementation manners. One implementation manner is that the feedback data includes data that is obtained after scrambled data generated by the third scrambling circuit is registered for one clock cycle. The other implementation manner is that the feedback data includes a result that is obtained after exclusive OR calculation is performed on a first result and a data calculation result that is generated by the third scrambling circuit, where the first result is obtained after feedback calculation is performed on feedback data that is provided by the third scrambling circuit and that is registered for one clock cycle.

It should be noted that, in this embodiment of the present invention, in step 103, the feedback calculation performed on the feedback data provided by the third scrambling circuit requires the use of the second scrambling factor determined by the scrambling polynomial. When performing feedback calculation, the second scrambling circuit uses the second scrambling factor, for example, the second scrambling circuit directly uses the second scrambling factor, or uses a scrambling factor that is obtained by performing transformation according to the second scrambling factor. A specific parameter of the second scrambling factor determined by the scrambling polynomial may be determined with reference to a protocol followed by data transmission, the scrambling polynomial, and a specific bandwidth standard that is involved in a transmission network. The specific parameter of the second scrambling factor is described in the following embodiments by using examples. In addition, for the first scrambling factor determined by the scrambling polynomial and the second scrambling factor determined by the scrambling polynomial that are used for the data calculation in step 102 and the feedback calculation in step 103, respective implementation manners and specific values of the scrambling factors need to be separately set with reference to specific requirements on the data calculation and the feedback calculation. Specifically, specific values or specific transformations of the first scrambling factor and the second scrambling factor may be determined with reference to an application scenario.

In some embodiments of the present invention, for the feedback calculation in step 103, the feedback calculation needs to be performed, by using the second scrambling factor determined by the scrambling polynomial, on the feedback data provided by the third scrambling circuit. As can be known from the description of the foregoing content, the feedback data in this embodiment may be provided by the third scrambling circuit. Step 103, that is, the second scrambling circuit performs, according to a second scrambling factor, feedback calculation on feedback data provided by a third scrambling circuit, to obtain a feedback calculation result generated by the second scrambling circuit, includes the following.

B1: The second scrambling circuit performs, according to a constant matrix in the second scrambling factor and a power exponent of the constant matrix, exclusive OR calculation on the feedback data provided by the third scrambling circuit, to obtain an exclusive OR result generated by the second scrambling circuit, where the power exponent is determined according to the location of the second data block in the second sub-data stream.

B2: The second scrambling circuit performs a shift operation on the exclusive OR result according to the location of the second data block in the second sub-data stream, to obtain the feedback calculation result generated by the second scrambling circuit.

A specific form of expression of the second scrambling factor that is used for the feedback calculation and that is determined by the scrambling polynomial may be a constant matrix and a power exponent of the constant matrix. In this case, the feedback calculation may be implemented by performing, by using a power exponent of a constant matrix, exclusive OR calculation on the feedback data provided by the third scrambling circuit. The constant matrix is a scrambling parametric value included in the second scrambling factor determined according to a scramble algorithm (that is, the scrambling polynomial). The power exponent is determined according to the location of the second data block in the second sub-data stream. To reduce an amount of calculation in the feedback calculation in the scrambling apparatus, the feedback calculation is changed into shift calculation. That is, a shift circuit may be disposed in the scrambling apparatus, and the feedback calculation is performed, by using the shift circuit and according to the second scrambling factor determined by the scrambling polynomial, on the feedback data provided by the third scrambling circuit. In a specific application, the shift circuit needs to be disposed with reference to a specific application scenario. In addition, for the second scrambling factor that is used for the feedback calculation and that is determined by the scrambling polynomial, a specific parameter of the second scrambling factor needs to be selected or a selected parameter needs to be transformed according to a specific application scenario.

104: The second scrambling circuit performs exclusive OR calculation on the data calculation result generated by the second scrambling circuit and the feedback calculation result generated by the second scrambling circuit, to obtain scrambled data generated by the second scrambling circuit, and the second scrambling circuit outputs the scrambled data generated by the second scrambling circuit.

In this embodiment of the present invention, by performing the foregoing steps 101 to 103, the scrambling apparatus may separately obtain the data calculation result generated by the second scrambling circuit and the feedback calculation result generated by the second scrambling circuit, obtain, according to the data calculation result generated by the second scrambling circuit and the feedback calculation result generated by the second scrambling circuit, the scrambled data generated by the second scrambling circuit, to complete scrambling processing of the second data block, and after scrambling is completed, output the scrambled data generated by the second scrambling circuit, to provide a choice for the feedback calculation. In addition, multi-lane distribution (Multi Lane Distribution, MLD) may be further performed on the obtained scrambled data generated by the second scrambling circuit.

It should be noted that, in this embodiment of the present invention, the scrambling processing of the second data block includes the data calculation described in step 102 and the feedback calculation described in step 103. The scrambling processing of the second data block further includes performing, on the basis of the data calculation and the feedback calculation, exclusive OR calculation on the data calculation result generated by the second scrambling circuit and the feedback calculation result generated by the second scrambling circuit. The exclusive OR calculation refers to performing GF2 field addition.

In some embodiments of the present invention, the foregoing step 102, that is, the second scrambling circuit performs data calculation on a second data block in the data stream and a first parameter according to the first scrambling factor, to obtain a data calculation result generated by the second scrambling circuit, may include:

if each data block in the data stream has n bits, the second data block is the $j^{th}$ data block in the data stream, and the first data block is the $j-1^{th}$ data block in the data stream, $D_{n,j}'=M \times N_{j-1}+F \times D_{n,j}$, where $D_{n,j}'$ is the data calculation result generated by the second scrambling circuit, $D_{n,j}$ is the second data block, $N_{j-1}$ is the first parameter, M is the first scrambling parametric value in the first scrambling factor, and F is the second scrambling parametric value in the first scrambling factor, where $$N_{j-1} = \sum_{i=1}^{j-2} M^{j-1-i} \times F \times D_{n,i};$$

$$P_{next} = A \times P_{curr} + B \times d_i;$$

$$\tilde{d}_i = C \times P_{curr} + d_i,$$

where $P_{next}$ is a status value of a status register in the scrambling apparatus in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$H = \begin{bmatrix} CA^{n-1} \\ \vdots \\ CA \\ C \end{bmatrix};$$

$$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

and $$M = H \times J,$$

where J is an order-reversing calculation parametric value. Step 103, that is, the second scrambling circuit performs, according to a second scrambling factor, feedback calculation on feedback data provided by a third scrambling circuit, to obtain a feedback calculation result generated by the second scrambling circuit, includes $$D_{n,j}'' = M^j \times \tilde{D}_{pre},$$

where $D_{n,j}''$ is the feedback calculation result generated by the second scrambling circuit, $\tilde{D}_{pre}$ is the scrambled data generated by the third scrambling circuit, and $M^j$ is a third scrambling parametric value in the second scrambling factor, and the performing, by the second scrambling circuit, exclusive OR calculation on the data calculation result generated by the second scrambling circuit and the feedback calculation result generated by the second scrambling circuit, to obtain scrambled data generated by the second scrambling circuit includes $$\tilde{D}_{n,j} = D_{n,j}'' + D_{n,j}',$$

where $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

In some embodiments of the present invention, step 102, that is, the second scrambling circuit performs data calculation on a second data block in the data stream and a first parameter according to the first scrambling factor, to obtain a data calculation result generated by the second scrambling circuit, includes if each data block in the data stream has n bits, the second data block is the $j^{th}$ data block in the data stream, and the first data block is the $J-1^{th}$ data block in the data stream, $$V_{n,j}' = \sum_{i=1}^{j} A_n^{j-1} \times G \times D_{n,i},$$

where $V_{n,j}'=T^{-1} \times D_{n,j}'$, $D_{n,j}'$ is the data calculation result generated by the second scrambling circuit, $D_{n,i}$ is a data block in the second sub-data stream, $G=T^{-1} \times F$, and F is the second scrambling parametric value in the first scrambling factor;

$$P_{next}=A\times P_{curr}+B\times d_i;$$

$$\tilde{d}_i=C\times P_{curr}+d_i,$$

where $P_{next}$ is a status value of a status register in the scrambling apparatus in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$A_n = T^{-1} \times M \times T;$$

$$A_n = \begin{bmatrix} A_{m\times m} & O \\ O & O_{(n-m)\times(n-m)} \end{bmatrix}, M = \begin{bmatrix} M_m & O \\ M_t & O \end{bmatrix},$$

t satisfies the following relationship: t=n−m, m is an order of A, $$T = \begin{bmatrix} T_m & T_a \\ T_b & I_b \end{bmatrix},$$

$b=[1\ 0\ \ldots\ 0]^T$, $T_m=(W_m^{-1})^T$, $W_m=[b\ M_m^T\cdot b\ \ldots\ (M_m^T)^{m-1}\cdot b]$, $T_a=O_{m\times b}$, $I_b$ is a $b^{th}$-order unit matrix, and $$H = \begin{bmatrix} CA^{n-1} \\ \vdots \\ CA \\ C \end{bmatrix};$$

$$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

and $$M=H<J,$$

where J is an order-reversing calculation parametric value, the performing, by the second scrambling circuit according to a second scrambling factor, feedback calculation on feedback data provided by a third scrambling circuit, to obtain a feedback calculation result generated by the second scrambling circuit includes $$V_{n,j}''=A_n^1\times \tilde{V}_{pre},$$

where $V_{n,j}''=T^{-1}\times D_{n,j}''$, $D_{n,j}''$ is the feedback calculation result generated by the second scrambling circuit, $\tilde{V}_{pre}= T^{-1}\times\tilde{D}_{pre}$, $\tilde{D}_{pre}$ is the scrambled data generated by the third scrambling circuit, and $A_n^j$ is a fourth scrambling parametric value in the second scrambling factor, and in step 103, the performing, by the second scrambling circuit, exclusive OR calculation on the data calculation result generated by the second scrambling circuit and the feedback calculation result generated by the second scrambling circuit, to obtain scrambled data generated by the second scrambling circuit includes $$\tilde{V}_{n,j}=V_{n,j}''+V_{n,j}'$$

where $\tilde{V}_{n,j}=T^{-1}\times\tilde{D}_{n,j}$, $V_{n,j}'=T^{-1}\times D_{n,j}'$, $V_{n,j}''=T^{-1}\times D_{n,j}''$, $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

As can be known from the description of this embodiment of the present invention, a scrambling apparatus may scramble a data stream including a first data block and a second data block. The first data block and the second data block may belong to a same sub-data stream, or may belong to different sub-data streams. A specification of the data stream when the first data block and the second data block belong to a same sub-data stream is different from a specification of the data stream when the first data block and the second data block belong to different sub-data streams. Therefore, the scrambling apparatus can scramble data streams of different specifications. Therefore, the foregoing technical solution expands an application scenario of the scrambling apparatus.

For ease of better understanding and implementation of the foregoing solution of the embodiment of the present invention, a corresponding application scenario is used in the following as a specific example for description. Next, a 100 Gbps Ethernet interface standard is used as an example for description. The 100 Gbps Ethernet interface standard uses self-synchronous scrambling. A scrambling polynomial defined in the IEEE 802.3 standard is as follows:

$$G(x)=1+x^{39}+x^{58} \tag{1}$$

Figure 2:
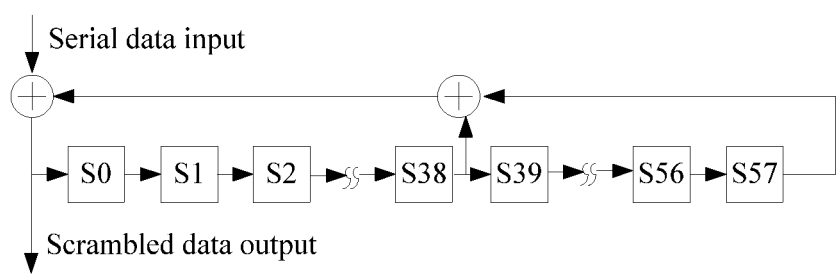
FIG. 2 is a schematic structural diagram of a scrambling apparatus according to an embodiment of the present invention.

Scrambling may be implemented by using a linear feedback shift register (Linear Feedback Shift Register, LFSR). FIG. 2 is a schematic structural diagram of a scrambling apparatus according to an embodiment of the present invention. S0 to S57 are status registers. To-be-scrambled serial data is added to data stored in S57 and S38, to obtain scrambled data. Then the scrambled data is stored in S0. S0 to S57 are shifted to the right. Scrambling of a bit can be implemented by means of the foregoing operation. The addition herein is modulo-2 addition, and is equivalent to performing an exclusive OR operation.

FIG. 3 is a schematic diagram of a location at which scrambling processing is performed in an Ethernet interface according to an embodiment of the present invention. FIG. 3 may be a schematic structural diagram of a 100 Gbps Ethernet interface. The scrambling processing may be performed by a physical coding sublayer (Physical Coding Sublayer, PCS). Specifically, the scrambling processing is performed by a scrambling circuit. The scrambling processing is a step for data processing. The data processing may include the following steps. A reconciliation sublayer (Reconciliation Sublayer, RS) transmits data to the PCS through a 400 Gb media-independent interface (400 Gigabit per second Media Independent Interface, CDGMII). CD corresponds to the Roman numeral 400. As can be seen from FIG. 3, the scrambling processing occurs after 64b/66b encoding is performed on the data and before multi-lane distribution (Multi-Lane Distribution, MLD) processing is performed on the data. When data blocks in a same data stream are scrambled, encoding processing and a scrambling operation are first performed according to virtual lanes (Virtual lane, VL), and then the data blocks are distributed to physical lanes (Physical Lane, PL). In the case of flexible Ethernet, a VL may belong to different sub-data streams (that is, one or more VLs may correspond to one sub-data stream), and data of different sub-data streams (corresponding to different VLs) needs to be separately scrambled. The MLD processing may be performed by an MLD circuit. After the MLD processing is completed, the physical coding sublayer transmits the data to a physical medium attachment (Physical Medium Attachment, PMA) circuit and a physical medium dependent (Physical Media Dependent, PMD) circuit through n lanes. The PMD circuit sends processed data to a physical medium through m lanes. The physical medium transmits the processed data to a destination device. The physical medium may be implemented by using an optical module or optical fiber. The PMD circuit may be coupled to the physical medium through a medium dependent interface (Medium Dependent Interface, MDI). In addition, n and m herein are non-zero natural numbers, and specific values of n and m may be determined with reference to an application scenario.

In the foregoing scrambling processing, a scrambling process is performing an exclusive OR operation on the $39^{th}$ bit (bit) and the $58^{th}$ bit of a status register to obtain a bit, and then performing an exclusive OR operation on the bit and a current bit, to generate and output scrambled data. Written as mathematical expressions, the process may be the following formulas (2) and (3):

$$P_{next} = A \times P_{curr} B \times d_i \qquad (2), \text{ and}$$

$$\tilde{d}_i = C \times P_{curr} + d_i \qquad (3), \text{ where}$$

$P_{next}$ is a status of the status register in a next clock cycle, $P_{curr}$ is a status of the status register in a current clock cycle, $d_i$ is unscrambled data, $\tilde{d}_i$ is scrambled data corresponding to the unscrambled data $d_i$, and the subscript i is a reference sign of the data. For example, $P_{curr}$ may be specifically a status value of a status register among the status registers (S0~S57) in FIG. 2.

In the foregoing formula (2) and formula (3), A, B, and C are constants. Using the status register shown in FIG. 2 and the scrambling polynomial being the formula (i) as an example, A, B, and C may be specifically the following matrices:

$$C = [\overset{57}{1} \ 0 \ \cdots \ 0 \ \overset{38}{1} \ 0 \ \cdots \ \overset{0}{0}], \qquad (4)$$

$$B = [0 \ \cdots \ 0 \ 1]', \text{ and} \qquad (5)$$

$$A = \begin{bmatrix} 0 & 1 & & & & & 0 \\ 0 & 0 & \ddots & 0 & & & \\ \vdots & & \ddots & 1 & 0 & & \\ 0 & & & 0 & 1 & 0 & \\ 0 & & & & 0 & 1 & \ddots \\ 0 & & & & & 0 & \ddots & 0 \\ \vdots & & & & \vdots & & \ddots & 1 & 0 \\ 0 & 0 & \cdots & 0 & 0 & 0 & \cdots & 0 & 1 \\ 1 & 0 & \cdots & 0 & 1 & 0 & \cdots & 0 & 0 \end{bmatrix}, \qquad (6)$$

where in the formula (4), if the matrix C is identified in such a sequence that high-order bits are on the left and low-order bits are on the right, the $57^{th}$ bit (the highest-order bit) and the $38^{th}$ bit are 1, and other bits are 0. In the formula (6), the last row of the matrix A is the same as the matrix C, and an upper-right corner of the matrix A is a unit matrix. In the formula (5), "'" in the matrix B represents transposition, the last bit in the matrix B is 1, and other bits in the matrix B are 0.

If data calculation needs to be performed on n bits in parallel, it is assumed that the status register can save any status among m statuses. At a time point, the status register can save only one status. A status matrix p formed by the m statuses satisfies the following relationship:

$$P = \begin{bmatrix} p_{m-1} \\ \vdots \\ p_1 \\ p_0 \end{bmatrix}, \qquad (7)$$

where $p_0$, $p_1$, and $P_{m-1}$ are respectively the $1^{st}$, $2^{nd}$, ..., and $m^{th}$ statuses in the status register, and in the 802.3 standard, m may be 58.

The foregoing formula (2) is iterated n times, and the following formula may be obtained:

$$P^{(n)} = A^n \times P + W \times D_n \qquad (8),$$

where statuses in a next clock cycle that respectively correspond to the statuses in the status matrix p form an output matrix $P^{(n)}$, and $D_n$ is an unscrambled data matrix formed by n pieces of data in encoded data.

The foregoing formula (3) is iterated n times, and the following formula may be obtained:

$$\tilde{D}_n = H \times P + F \times D_n \qquad (9),$$

where $\tilde{D}_n$ is a scrambled data matrix formed by n pieces of data in scrambled data, $D_n$ is the unscrambled data matrix formed by the n pieces of data in the encoded data, and p is the status matrix formed by the m statuses in the status register.

In the foregoing formula (8) and formula (9), W, H, and F may be specifically the following matrices:

$$W = [B \ AB \ \cdots \ A^{n-1} \times B], \qquad (10)$$

$$H = \begin{bmatrix} CA^{n-1} \\ \vdots \\ CA \\ C \end{bmatrix}, \qquad (11)$$

and $$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix}, \qquad (12)$$

where $D_n$ in the formulas (8) and (9) may be represented by the following formula (13):

$$D_n = \begin{bmatrix} d_{i+n-1} \\ \vdots \\ d_{i+1} \\ d_i \end{bmatrix}. \qquad (13)$$

$P^{(n)}$ in the formula (8) represents a status value stored in the status register P after iteration processing of the n bits is performed. $\tilde{D}_n$ in the formula (9) represents scrambled data of the n bits. As can be seen from the foregoing formula (8) and formula (9), the status values stored in the status register shift continuously, and a low-order status value in the status register is padded with scrambled data. Therefore, the formula (8) may be further transformed into the following formula:

$$P^{(n)} = E^n \times P + J \times \tilde{D}_n \qquad (14),$$

where the n pieces of data in the scrambled data form the scrambled data matrix $\tilde{D}_n$, and the output matrix $P^{(n)}$ in the status register may be obtained by using a calculation manner in the formula (14).

Using the status register shown in FIG. 2 and the scrambling polynomial being the formula (1) as an example, the matrix A, the matrix B, and the matrix C are respectively substituted into the matrix W, the matrix H, and the matrix F, and the following formulas of a matrix E and a matrix J may be obtained:

$$E = \begin{bmatrix} 0 & 1 & 0 & 0 & 0 & 0 & \ldots & 0 & 0 \\ 0 & 0 & \ddots & 0 & 0 & 0 & \ldots & 0 & 0 \\ 0 & 0 & \ddots & 1 & 0 & 0 & \ldots & \vdots & \vdots \\ 0 & 0 & 0 & 0 & 1 & 0 & \ldots & 0 & 0 \\ \vdots & \vdots & 0 & 0 & 0 & 1 & \ddots & 0 & 0 \\ 0 & 0 & \ldots & 0 & 0 & 0 & \ddots & 0 & 0 \\ 0 & 0 & \ldots & 0 & 0 & 0 & \ddots & 1 & 0 \\ 0 & 0 & \ldots & 0 & 0 & 0 & \ldots & 0 & 1 \\ 0 & 0 & \ldots & 0 & 0 & 0 & \ldots & 0 & 0 \end{bmatrix}, \text{ and} \quad (15)$$

$$J = \begin{bmatrix} 0 & \ldots & 0 & 1 & 0 & \ldots & 0 \\ 0 & \ldots & 1 & 0 & 0 & \ldots & 0 \\ \vdots & \ddots & \vdots & \vdots & \vdots & \ddots & \vdots \\ 1 & \ldots & 0 & 0 & 0 & \ldots & 0 \end{bmatrix}, \quad (16)$$

or $$J = \begin{bmatrix} 0 & 0 & \ldots & 0 \\ \vdots & \vdots & \ddots & \vdots \\ 0 & 0 & \ldots & 0 \\ 0 & 0 & \ldots & 1 \\ \vdots & \vdots & \ddots & \vdots \\ 0 & 1 & \ldots & 0 \\ 1 & 0 & \ldots & 0 \end{bmatrix}. \quad (17)$$

In the formula (15), elements on a minor diagonal of the matrix E are 1, and the other elements are all 0. In the formula (14), the matrix E raised to the power of n is left-multiplied by the matrix P, which indicates that the matrix P is shifted by n columns. The matrix J is an m×n$^{th}$-order matrix. If m<n, the matrix J is represented by the formula (16); otherwise, the matrix J is represented by the formula (17).

In 100 Gbps Ethernet, 64b/66b encoding is used, and therefore, a smallest data block has 64 bits. In this embodiment of the present invention, next, m<n, particularly a case in which n=64, is used as an example for description. Other cases may be deduced by analogy according to the data scrambling method provided in the present invention. In this case, a parallel calculation formula may be simplified into the following formula (18):

$$\tilde{D}_{n,j} = M \times \tilde{D}_{n,j-1} + F \times D_{n,j} \quad (18), \text{ where}$$

M satisfies the following formula (19):

$$M = H \times J \quad (9).$$

If a sub-data stream in Ethernet includes l data blocks, if n pieces of data form a data block and scrambling calculation is performed on the l data blocks in parallel, a value range of j in the formula (18) is 1 to l. $\tilde{D}_{n,j}$ is the j$^{th}$ scrambled data matrix $\tilde{D}_n$, and $D_{n,j}$ is the j$^{th}$ unscrambled data matrix $D_n$. When j=1, $\tilde{D}_{n,j-1}$ represents a calculation result of the last data block in a previous clock cycle, which may be represented by $\tilde{D}_{pre}$. Scrambling calculation is performed on the l data blocks in parallel. In a case in which j>0, the formula (18) is iterated and expanded, and the following formula may be obtained:

$$\tilde{D}_{n,j} = M^j \times \tilde{D}_{pre} + \sum_{i=1}^{j-1} M^{j-i} \times F \times D_{n,i}, \quad (20)$$

where $\tilde{D}_{n,j}$ is the j$^{th}$ scrambled data matrix $\tilde{D}_n$, and $\tilde{D}_{pre}$ is a scrambled data matrix obtained by performing scrambling calculation on a data block in a previous clock cycle before scrambling calculation is performed in a current clock cycle.

$$\sum_{i=1}^{j-1} M^{j-i} \times F \times D_{n,i}$$

in the formula (20) is defined as an intermediate quantity $N_j$ of data calculation, and therefore, the following formula (21) and formula (22) exist:

$$N_j = \sum_{i=1}^{j-1} M^{j-i} \times F \times D_{n,i}, \quad (21)$$

and $$N_{j+1} = M \times N_j + F \times D_{n,j+1}. \quad (22)$$

According to the formula (21) and the formula (22), the formula (20) may be transformed into the following formula (23):

$$\tilde{D}_{n,j} = M^j \times \tilde{D}_{pre} + M \times N_{j-1} + F \times D_{n,j} \quad (23).$$

As can be known from the formula (23), scrambling calculation performed on unscrambled data (that is, the foregoing scrambling processing) may include two parts: data calculation and feedback calculation. As can be known from the formula (23), j is used to indicate a current stage, and j−1 is used to indicate a previous stage, the data calculation is classified into data calculation of the previous stage (that is, M×N$_{j-1}$) and data calculation of the current stage (that is, F×D$_{n,j}$), and the feedback calculation may be performed by using M$^j$×$\tilde{D}_{pre}$. FIG. 4-a is a schematic diagram of a circuit performing scrambling processing on a data block according to an embodiment of the present invention. For example, in FIG. 4-a, a second scrambling circuit performs scrambling processing on a second data block. Data calculation performed by the second scrambling circuit may include: completing data calculation by using M×N$_{j-1}$+F×D$_{n,j}$, to obtain a data calculation result generated by the second scrambling circuit. Feedback calculation performed by the second scrambling circuit may include: completing feedback calculation by using M$^j$×$\tilde{D}_{pre}$, to obtain a feedback calculation result generated by the second scrambling circuit. j represents a number of a data block, k represents a number of a data block D$_{n,j}$ in a sub-data stream, and Z$^{-1}$ represents a unit delay. For the formula (23), in unscrambled data, n pieces of data form a data block, the j$_{th}$ data block is D$_{n,j}$, data output after Z$^{-1}$ is a data calculation result of a current stage, and $\tilde{D}_{n,j}$ is scrambled data of the current stage. A selector obtains, from multiple scrambling circuits included in a scrambling apparatus, scrambled data generated by the multiple scrambling circuits, performs selection from the scrambled data, and defines selected data as feedback data provided by a third scrambling circuit. After the feedback data provided by the third scrambling circuit is multiplied by M raised to the power of k, a feedback calculation result of the current stage is obtained. After exclusive OR calculation is performed on the data calculation result of the current stage and the feedback calculation result of the current stage, scrambled data $\tilde{D}_{n,j}$ of the current stage is obtained.

The second scrambling circuit may perform the scrambling processing shown in FIG. 4-a. First, matrix multiplication calculation (that is, calculation in GF(2)) is performed on the data $D_{n,j}$ and the matrix F, and multiplication calculation is performed on a data calculation result $N_{j-1}$ in a previous clock cycle and the matrix M. Then, exclusive OR calculation (addition in the GF(2) field) is performed on results of the two types of calculation, to obtain a data calculation result $N_j$ of a current stage. The data calculation result $N_j$ is transferred to a next stage for use, and at the current stage, $N_j$ is also transferred for subsequent scrambling calculation. The feedback calculation is multiplying the feedback data provided by the third scrambling circuit by the matrix M raised to the power of k to obtain a multiplication result, and then performing exclusive OR calculation on the multiplication result and the data calculation result $N_j$ of the current stage, to obtain final scrambled data.

FIG. 4-a describes the second scrambling circuit that performs scrambling processing on $D_{n,j}$. Next, referring to FIG. 4-b, FIG. 4-b is a schematic structural diagram of a scrambling apparatus performing parallel scrambling processing on l data blocks. Scrambling processing is performed on encoded data blocks $D_{n,1}, D_{n,2}, \ldots,$ and $D_{n,j}$ in parallel according to a clock cycle, and data calculation results of the data block $D_{n,1}$ to the data block $D_{n,j-1}$ are transferred to a next stage. For feedback calculation, scrambled data of a stage is selected from a selector, to obtain a feedback calculation result. After exclusive OR calculation is performed on data calculation results and feedback calculation results of stages, scrambled data $\tilde{D}_{n,1}, \tilde{D}_{n,2}, \ldots,$ and $\tilde{D}_{n,j}$ of the stages may be obtained.

In the case of scrambling calculation of variable bandwidth, circuit structures of the scrambling circuits included in the foregoing scrambling apparatus may remain almost unchanged, and only the following three aspects need to be configured for applicability to data streams of other specifications. First, a switch that is used during multiplication calculation of the matrix M. If a data block processed by a scrambling circuit of a previous stage and a data block processed by a scrambling circuit of a current stage belong to a same sub-data stream, the switch needs to be turned on, that is, a data calculation result of the previous stage is allowed to be transferred to the current stage for data calculation of the current stage; if the data block processed by the scrambling circuit of the previous stage and the data block processed by the scrambling circuit of the current stage belong to two different sub-data streams, the switch needs to be turned off (that is, the data calculation result of the previous stage may be set to 0), that is, the data calculation result of the previous stage is not used for data calculation of the current stage, and the current stage is used as the first stage of the sub-data stream to which the data block processed at the current stage belongs. Second, a value of the power exponent k of the matrix M. The value of k is a number of the current stage for the sub-data stream to which the data block processed at the current stage belongs. For example, if the current stage is the first stage of the sub-data stream, the value of k is 1; if the current stage is the second stage of the sub-data stream, the value of k is 2; and the rest can be deduced by analogy. k is determined according to a location of the data block in the sub-data stream. Third, a source of the feedback data. The feedback data is a feedback calculation result of the last stage of a same sub-data stream. If the current stage is the last stage of the sub-data stream to which the data block processed at the current stage belongs, the feedback data is from scrambled data of the current stage, that is, the selector selects the scrambled data of the current stage; if the current stage is not the last stage of the sub-data stream, the feedback data is from scrambled data the subsequent last stage. The selector has a maximum of l sources, that is, the scrambled data of the current stage and scrambled data of stages after the current stage. By means of the foregoing three configurations, the scrambling apparatus is applicable to scrambling of data streams of multiple specifications, and an application scenario of the scrambling apparatus is expanded.

It should be noted that FIG. 4-b shows an overall structure of the scrambling apparatus. The scrambling apparatus is formed by multiple scrambling circuits connected to each other. The data calculation in the foregoing scrambling processing may be performed by using a pipeline structure, that is, may be registered for multiple clock cycles, which is determined according to a specific time sequence status. The feedback calculation in the scrambling processing needs to be completed within one clock cycle.

Next, a scrambling apparatus provided in an embodiment of the present invention is described by using another application scenario as example.

To optimize the scrambling apparatus shown in FIG. 4-a and FIG. 4-b, a key path at which feedback calculation is performed may be optimized. A rank of the matrix M is 58, and the matrix M and the matrix A in the formula (6) have a same characteristic polynomial. Therefore, a matrix T may be constructed, to satisfy the following formula (24):

$$A_n = T^{-1} \times M \times T \quad (24).$$

The matrix T may be solved according to the following calculation manner:

First, block processing is performed on the matrix $A_n$ and the matrix M, to obtain the following formulas (25) and (26):

$$A_n = \begin{bmatrix} A_{m \times m} & O \\ O & O_{(n-m) \times (n-m)} \end{bmatrix} \quad (25)$$

and $$M = \begin{bmatrix} M_m & O \\ M_t & O \end{bmatrix}, \quad (26)$$

where t in the foregoing formula (26) satisfies the following relationship: t=n−m.

Using the status register shown in FIG. 2 and the scrambling polynomial being formula (i) as an example, the matrix $A_n$ is a $64^{th}$-order matrix obtained by extending the $58^{th}$-order matrix A, and compared with the matrix A, elements of extended rows and columns are equal to 0. The matrix M may be represented in a form of a block, for example, the formula (26). The matrix T may also be represented by a block, for example, the formula (27):

$$T = \begin{bmatrix} T_m & T_a \\ T_b & I_b \end{bmatrix}, \quad (27)$$

where $b$, $T_m$, $W_m$, $T_b$, and $T_a$ respectively satisfy the following relationships:

$$b=[1 0 \ldots 0]^T \quad (28),$$

$$T_m=(W_m^{-1})^T \quad (29),$$

$$W_m=[bM_m^T \cdot b \ldots (M_m^T)^{m-1} \cdot b] \quad (30),$$

$$T_b=M_t \times M_m^{-1} \times T_m \quad (31), \text{ and}$$

$$T_a=O_{m \times b} \quad (32).$$

The matrix $I_b$ is a $b^{th}$-order unit matrix. Therefore, the matrix $T$ may be obtained by using the foregoing formula (28) to the formula (32), and the matrix $T^{-1}$ may be obtained by calculating an adjoint matrix of the matrix $T$. The formula (24) is substituted into the formula (20), and the following formula (33) may be obtained:

$$\tilde{D}_{n,j} = TA_n^j T^{-1} \times \tilde{D}_{pre} + \sum_{i=1}^{j} TA_n^{j-i} T^{-1} \times F \times D_{n,i}. \quad (33)$$

Each variable at the two ends of the formula (33) is left-multiplied by the matrix $T^{-1}$, and the following formula (34) may be obtained:

$$\tilde{V}_{n,j} = A_n^j \times \tilde{V}_{pre} + \sum_{i=1}^{j} A_n^{j-i} \times G \times D_{n,i}, \quad (34)$$

where $\tilde{V}_{n,j}$, $\tilde{V}_{pre}$, and $G$ respectively satisfy the following relationships:

$$\tilde{V}_{n,j}=T^{-1} \times \tilde{D}_{n,j} \quad (35),$$

$$\tilde{V}_{pre}=T^{-1} \times \tilde{D}_{pre} \quad (36), \text{ and}$$

$$G=T^{-1} \times F \quad (37).$$

As can be known from the formula (34), scrambling calculation performed on unscrambled data (that is, the foregoing scrambling processing) may include two parts: data calculation and feedback calculation. The data calculation is performed by using $$\sum_{i=1}^{j} A_n^{j-i} \times G \times D_{n,i},$$

and the feedback calculation is performed by using $A_n^j \times \tilde{V}_{pre}$. FIG. 5-$a$ is a schematic diagram of another circuit performing scrambling processing on a data block according to an embodiment of the present invention. For example, in FIG. 5-$a$, a second scrambling circuit performs scrambling processing on a second data block. Data calculation performed by the second scrambling circuit may include completing data calculation by using $$\sum_{i=1}^{j} A_n^{j-i} \times G \times D_{n,i},$$

to obtain a data calculation result generated by the second scrambling circuit. Feedback calculation performed by the second scrambling circuit may include: completing feedback calculation by using $A_n^j \times \tilde{V}_{pre}$ to obtain a feedback calculation result generated by the second scrambling circuit. j represents a number of a data block, k represents a number of a data block $D_{n,j}$ in a sub-data stream, and $Z^{-1}$ represents a unit delay. A selector obtains, from multiple scrambling circuits included in a scrambling apparatus, scrambled data generated by the multiple scrambling circuits, performs selection from the scrambled data, and defines selected data as feedback data provided by a third scrambling circuit. After the feedback data provided by the third scrambling circuit is multiplied by the matrix A raised to the power of k, a feedback calculation result of a current stage is obtained. After exclusive OR calculation is performed on a data calculation result of the current stage and the feedback calculation result of the current stage, scrambled data $\tilde{D}_{n,j}$ of the current stage is obtained.

The second scrambling circuit may perform the scrambling processing shown in FIG. 5-$a$. After the data calculation of the current stage, the data calculation result of the current stage is output. $\tilde{D}_{n,j}$ is the scrambled data of the current stage. The selector selects, from the scrambled data (that is, $\tilde{V}_j$) generated by the multiple scrambling circuits, the feedback data provided by the third scrambling circuit. After the feedback data is multiplied by A raised to the power of k, the feedback calculation result of the current stage is obtained. Exclusive OR calculation is performed on the data calculation result of the current stage and the feedback calculation result of the current stage, to obtain the scrambled data of the current stage. Next, referring to FIG. 5-$b$, FIG. 5-$b$ is a schematic structural diagram of another scrambling apparatus performing parallel scrambling processing on l data blocks. Scrambling processing is performed on encoded data blocks $D_{n,2}$, $D_{n,j}$, ..., and $D_{n,1}$ in parallel according to a clock cycle, and data calculation results of the data block $D_{n,1}$ to the data block $D_{n,j-1}$ are transferred to a next stage. For feedback calculation, scrambled data of a stage is selected from a selector, to obtain a feedback calculation result. Scrambled intermediate results $\tilde{V}_1$, $\tilde{V}_2$, ..., and $\tilde{V}_j$ of stages may be obtained according to data calculation results and feedback calculation results of the stages, and then the scrambled intermediate results $\tilde{V}_1$, $\tilde{V}_2$, ..., and $\tilde{V}_j$ of the stages are separately multiplied by the matrix T, to obtain scrambled data $\tilde{D}_{n,1}$, $\tilde{D}_{n,2}$, ..., and $\tilde{D}_{n,j}$.

Further, because the matrix A is a sparse matrix, the matrix A raised to the power of k may be simplified. A result obtained by performing multiplication calculation on a scrambled intermediate result V and the matrix A is a shift of the scrambled intermediate result V. Referring to FIG. 6, FIG. 6 is a schematic diagram of a circuit for exclusive OR calculation in power multiplication calculation according to an embodiment of the present invention. A data stream f may be constructed, and the circuit for exclusive OR calculation shown in FIG. 6 is used. The first 58 bits of output data f is input data V. The highest-order bit of f is represented by f(57), and the rest follows a rule of progressive decreasing. Therefore, f(−1) may be represented by V(57)^V(38), f(−2) may be represented by V(56)^V(37), and the rest can be deduced until f(−39). The scrambled intermediate result V is multiplied by the matrix A raised to the power of k, and a calculation result may be represented by a shift of the f sequence. When k=0, a result is f(57:0); when k=1, a result is f(56:−1); and the rest can be deduced by analogy. Power multiplication calculation of a matrix is implemented by using the circuit for exclusive OR calculation shown in FIG. 6 plus a shift circuit.

It should be noted that, in the foregoing embodiment, a selection circuit may be used to select the scrambled intermediate result V, a circuit for exclusive OR calculation may be used to generate f, and finally, the shift circuit may be used to complete power multiplication calculation, to obtain a feedback calculation result; and exclusive OR calculation is performed according to the feedback calculation result and a data calculation result, to complete scrambling processing.

Next, another application scenario is used as an example for description.

In both the scrambling circuit in FIG. 5-a and the scrambling apparatus in FIG. 5-b, the matrix $A_n$ and the matrix M are used to form similar matrices, which simplifies feedback calculation compared with FIG. 4-a and FIG. 4-b. When bandwidth is relatively large, feedback calculation may be further simplified in the following manner. Because only a scrambling circuit that processes a data block of the last stage in a sub-data stream generates effective feedback data, FIG. 7-a, which is a schematic diagram of another circuit performing scrambling processing on $D_{n,j}$ according to an embodiment of the present invention, may be used. $Z^{-1}$ represents a unit delay, n pieces of data in unscrambled data form a data block, and the $j^{th}$ data block is $D_{n,j}$.

As shown in FIG. 7-a, scrambling processing performed by a second scrambling circuit on a second data block is used an example. The second scrambling circuit first performs data calculation, to obtain a data calculation result generated by the second scrambling circuit, and transfers the data calculation result generated by the second scrambling circuit to a scrambling circuit of a next stage; performs multiplication calculation on feedback data generated by the second scrambling circuit in a previous clock cycle and the matrix A raised to the power of k, to obtain a first result generated by the second scrambling circuit; performs exclusive OR calculation on the first result generated by the second scrambling circuit and the data calculation result generated by the second scrambling circuit, to obtain feedback data generated by the second scrambling circuit; and inputs the feedback data generated by the second scrambling circuit into a selector. The selector may receive feedback data generated by multiple scrambling circuits of the scrambling apparatus. The selector outputs feedback data provided by a third scrambling circuit. Then multiplication calculation is performed on the feedback data provided by the third scrambling circuit and the matrix A raised to the power of k, to obtain a feedback calculation result generated by the second scrambling circuit. Then exclusive OR calculation is performed on the feedback calculation result generated by the second scrambling circuit and the data calculation result generated by the second scrambling circuit, to generate a scrambled intermediate result $\tilde{V}_{n,j}$. Multiplication calculation is performed on the scrambled intermediate result $\tilde{V}_{n,j}$ and the matrix T, to obtain scrambled data $\tilde{D}_{n,j}$.

Next, referring to FIG. 7-b, FIG. 7-b is a schematic structural diagram of another scrambling apparatus performing parallel scrambling processing on l data blocks. Scrambling processing is performed on encoded data blocks $D_{n,1}$, $D_{n,2}$, ..., and $D_{n,j}$ in parallel according to a clock cycle, and data calculation results of the data block $D_{n,1}$ to the data block $D_{n,j-1}$ are transferred to a next stage. For feedback calculation, scrambled data of a stage is selected from a selector, to obtain a feedback calculation result by means of calculation. Scrambled data $\tilde{D}_{n,1}$, $\tilde{D}_{n,2}$, ..., and $\tilde{D}_{n,j}$ may be obtained according to data calculation results and feedback calculation results of stages.

In the implementation manners in FIG. 7-a and FIG. 7-b, the feedback calculation may be divided into a selection operation of the feedback data and multiplication calculation performed on the feedback data and the matrix A raised to the power of k. Therefore, for the selection operation of the feedback data and the multiplication calculation performed on the feedback data and the matrix A raised to the power of k, a pipeline structure may be used. Between the selection operation of the feedback data and the multiplication calculation performed on the feedback data and the matrix A raised to the power of k, a register may be used for registration, to resolve a time sequence problem. Compared with the implementation manners in FIG. 5-a and FIG. 5-b, the scrambling apparatuses in FIG. 7-a and FIG. 7-b can implement simplification of feedback calculation.

As can be known from the exemplary descriptions of FIG. 5-a, FIG. 5-b, FIG. 7-a, and FIG. 7-b, after a data block is received, an operation of multiplying the data block by the matrix G is performed, and before scrambled data is output, multiplication calculation is performed on the matrix T. Multiplication calculation performed on matrices may be implemented by a multiply-accumulator. The matrix A is a sparse matrix, and few resources are occupied for accumulation calculation after multiplication of the matrix A. If one lane requires two matrix multiplication calculations and one multiplication calculation of the matrix A raised to the power of k, 2X+Y resources are required in total. There are n lanes in total, and a total resource is R=2*n*X+n*Y. X is a resource for one m-bit matrix multiplication calculation, and Y is a resource for multiplication calculation of the power of the matrix A and feedback data. In Xilinx V7, X is a 0.1K lookup table (Look-Up-Table, LUT), and a maximum value of Y is a 1.5K LUT. When a quantity of lanes is not greater than 16, X is 0.1K. When n is 16, a required total resource≈10K LUT. In the case of scrambling of fixed bandwidth, Y and X resources are approximately of a same size, and a total resource≈5K LUT.

As can be known from the exemplary descriptions of the present invention in the foregoing embodiments, the data scrambling method is applicable to scrambling of data blocks in data streams of multiple specifications, and multiple sub-data streams can be scrambled simultaneously. Compared with a scrambling method in the prior art, fewer resources are required, and the present invention is applicable to a relatively high clock frequency.

It should be noted that, for the foregoing method embodiments, for ease of description, the embodiments are described as a series of action combinations. However, persons skilled in the art should know that the present invention is not limited to the described action sequence, because some steps may be performed in another sequence or simultaneously. In addition, persons skilled in the art should also know that the embodiments described in this specification are all preferred embodiments, and involved actions and modules are not necessarily essential.

For better implementation of the foregoing solutions in the embodiments of the present invention, the following further provides a related apparatus configured to implement the foregoing solutions.

Figure 8:
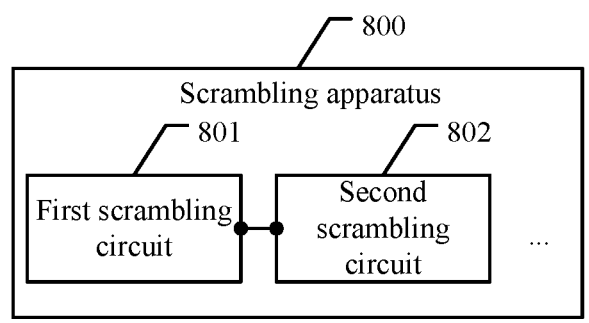
FIG. 8 is a schematic structural diagram of a scrambling apparatus according to an embodiment of the present invention.

Referring to FIG. 8, FIG. 8 is a schematic structural diagram of a scrambling apparatus 800 according to an embodiment of the present invention. The scrambling apparatus 800 may be configured to execute the method shown in FIG. 1. For specific implementation of the scrambling apparatus 800, reference may be made to the embodiment corresponding to FIG. 1. The scrambling apparatus 800 may include multiple scrambling circuits, and the multiple scrambling circuits include a first scrambling circuit 801 and a second scrambling circuit 802.

The first scrambling circuit 801 is configured to perform the following step:

performing data calculation on a first data block according to a first scrambling factor, to obtain a data calculation result generated by the first scrambling circuit, where the first scrambling factor is a scrambling factor determined by a scrambling polynomial, the first data block belongs to a first sub-data stream, and the first sub-data stream belongs to a data stream transmitted to the scrambling apparatus.

In some embodiments of the present invention, the second scrambling circuit 802 is specifically configured to perform multiplying a first scrambling parametric value in the first scrambling factor by the first parameter, to obtain a first multiplication result generated by the second scrambling circuit, multiplying a second scrambling parametric value in the first scrambling factor by the second data block, to obtain a second multiplication result generated by the second scrambling circuit, and performing exclusive OR calculation on the first multiplication result and the second multiplication result, to obtain the data calculation result generated by the second scrambling circuit.

In some embodiments of the present invention, the second scrambling circuit is specifically configured to perform, according to a constant matrix in the second scrambling factor and a power exponent of the constant matrix, exclusive OR calculation on the feedback data provided by the third scrambling circuit, to obtain an exclusive OR result generated by the second scrambling circuit, where the power exponent is determined according to the location of the second data block in the second sub-data stream, and performing a shift operation on the exclusive OR result according to the location of the second data block in the second sub-data stream, to obtain the feedback calculation result generated by the second scrambling circuit.

In some embodiments of the present invention, the second scrambling circuit is specifically configured to, if each data block in the data stream has n bits, the second data block is the $j^{th}$ data block in the data stream, and the first data block is the $j-1^{th}$ data block in the data stream, $$D_{n,j}' = M \times N_{j-1} + F \times D_{n,j},$$

where $D_{n,j}'$ is the data calculation result generated by the second scrambling circuit, $D_{n,j}$ is the second data block, $N_{j-1}$ is the first parameter, M is the first scrambling parametric value in the first scrambling factor, and F is the second scrambling parametric value in the first scrambling factor, where $$N_{j-1} = \sum_{i=1}^{j-2} M^{j-1-i} \times F \times D_{n,i};$$

$$P_{next} = A \times P_{curr} + B \times d_i;$$

$$\tilde{d}_i = C \times P_{curr} + d_i,$$

where $P_{next}$ is a status value of a status register in the scrambling apparatus in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$H = \begin{bmatrix} CA^{n-1} \\ \vdots \\ CA \\ C \end{bmatrix};$$

$$F = \begin{bmatrix} 1 & CB & CAB & \cdots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

$$M = H \times J,$$

where J is an order-reversing calculation parametric value;

$$D_{n,j}'' = M^j \times \tilde{D}_{pre},$$

where $D_{n,j}''$ is the feedback calculation result generated by the second scrambling circuit, $\tilde{D}_{pre}$ is the scrambled data generated by the third scrambling circuit, and $M^j$ is a third scrambling parametric value in the second scrambling factor, feedback calculation is performed, in the following manner, on the feedback data generated by the third scrambling circuit:

$$D_{n,j}'' = M^j \times \tilde{D}_{pre},$$

where $D_{n,j}''$ is the feedback calculation result generated by the second scrambling circuit, $\tilde{D}_{pre}$ is the scrambled data generated by the third scrambling circuit, and $M^j$ is a third scrambling parametric value in the second scrambling factor, and exclusive OR calculation is performed, in the following manner, on the data calculation result generated by the second scrambling circuit and the feedback calculation result generated by the second scrambling circuit:

$$\tilde{D}_{n,j} = D_{n,j}'' + D_{n,j}'',$$

where $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

In some embodiments of the present invention, the second scrambling circuit is specifically configured to perform the following steps:

if each data block in the data stream has n bits, the second data block is the $j^{th}$ data block in the data stream, and the first data block is the $j-1^{th}$ data block in the data stream, $$V_{n,j}' = \sum_{i=1}^{j} A_n^{j-i} \times G \times D_{n,i},$$

where $V_{n,j}' = T^{-1} \times D_{n,j}'$, $D_{n,j}'$ is the data calculation result generated by the second scrambling circuit, $D_{n,j}$ is a data block in the second sub-data stream, $G = T^{-1} \times F$, and F is the second scrambling parametric value in the first scrambling factor;

$$P_{next} = A \times P_{curr} + B \times d_i;$$

$$\tilde{d}_i = C \times P_{curr} + d_i,$$

where $P_{next}$ is a status value of a status register in a next clock cycle, $P_{curr}$ is a status value of the status register in a current clock cycle, $\tilde{d}_i$ is scrambled data corresponding to $d_i$ in the data stream, and $d_i$ is the $i^{th}$ bit in the data stream;

$$A_n = T^{-1} \times M \times T;$$

$$A_n = \begin{bmatrix} A_{m \times m} & O \\ O & O_{(n-m) \times (n-m)} \end{bmatrix},$$

$$M = \begin{bmatrix} M_m & O \\ M_t & O \end{bmatrix},$$

t satisfies the following relationship: t=n−m, m is an order of A, $$T = \begin{bmatrix} T_m & T_a \\ T_b & I_b \end{bmatrix},$$

$b=[1\ 0\ \ldots\ 0]^T$, $T_m=(W_m^{-1})^T$, $W_m=[b\ M_m^T \cdot b\ \ldots\ (M_m^T)^{m-1} \cdot b]$, $T_b=M_t \times M_m^{-1} \times T_m$, $T_a=O_{m \times b}$, $I_b$ is a $b^{th}$-order unit matrix, and $$H = \begin{bmatrix} CA^{n-1} \\ \vdots \\ CA \\ C \end{bmatrix};$$

$$F = \begin{bmatrix} 1 & CB & CAB & \ldots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix};$$

$M = H \times J,$ where J is an order-reversing calculation parametric value;

$V_{n,j}'' = A_n^j \times \tilde{V}_{pre},$ where $V_{n,j}''=T^{-1} \times D_{n,j}''$, $D_{n,j}''$ is the feedback calculation result generated by the second scrambling circuit, $\tilde{V}_{pre}=T^{-1} \times \tilde{D}_{pre}$, $\tilde{D}_{pre}$ is the scrambled data generated by the third scrambling circuit, and $A_n^j$ is a fourth scrambling parametric value in the second scrambling factor, and the performing, by the second scrambling circuit, exclusive OR calculation on the data calculation result generated by the second scrambling circuit and the feedback calculation result generated by the second scrambling circuit, to obtain scrambled data generated by the second scrambling circuit includes $\tilde{V}_{n,j} = V_{n,j}'' + V_{n,j}',$ where $\tilde{V}_{n,j}=T^{-1} \times \tilde{D}_{n,j}$, $V_{n,j}'=T^{-1} \times D_{n,j}'$, $V_{n,j}''=T^{-1} \times D_{n,j}''$, $\tilde{D}_{n,j}$ is the scrambled data generated by the second scrambling circuit, $D_{n,j}'$ is the data calculation result generated by the second scrambling circuit, and $D_{n,j}''$ is the feedback calculation result generated by the second scrambling circuit.

As can be known from the description of this embodiment of the present invention, a scrambling apparatus may scramble a data stream including a first data block and a second data block. The first data block and the second data block may belong to a same sub-data stream, or may belong to different sub-data streams. A specification of the data stream when the first data block and the second data block belong to a same sub-data stream is different from a specification of the data stream when the first data block and the second data block belong to different sub-data streams. Therefore, the scrambling apparatus can scramble data streams of different specifications. Therefore, the foregoing technical solution expands an application scenario of the scrambling apparatus.

In addition, it should be noted that the described apparatus embodiment is merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided in the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the foregoing descriptions of the embodiments, persons skilled in the art may clearly understand that the present invention may be implemented by hardware, by software in addition to necessary universal hardware, or certainly by dedicated hardware, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, digital circuit implementation is a better implementation manner in most cases. Based on such an understanding, the technical solutions in the present invention essentially or the part contributing to the prior art may be implemented in a form related to hardware, such as an application-specific integrated circuit (ASIC, Application Specific Integrated Circuit) or a field programmable gate array (FPGA, Field Programmable Gate Array), including several hardware structure modules for enabling a computer device (which may be a personal computer, a server, a network device, or the like) to execute the methods described in the embodiments of the present invention.

In conclusion, the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments.

What is claimed is:

1. A method, comprising:
   receiving, by an apparatus, a data stream, wherein an apparatus comprises multiple circuits, and the multiple circuits comprise a first circuit, a second circuit, a third circuit, and a switch;
   performing, by the first circuit, data calculation on a first data block according to a first scrambling factor, to obtain a first data calculation result generated by the first circuit, wherein the first scrambling factor is determined by a scrambling polynomial, and wherein the first data block belongs to a first sub-data stream, and the first sub-data stream belongs to the data stream;

in response to a second data block of the data stream belonging to a same sub-data stream as the first data block, sending, by the switch, the first data calculation result generated by the first circuit to the second circuit, wherein the second data block is located after the first data block and is adjacent to the first data block in the data stream during serial transmission;

performing, by the second circuit according to the first scrambling factor and a first parameter, data calculation on the second data block in the data stream, to obtain a second data calculation result generated by the second circuit, wherein the second data block belongs to a second sub-data stream, wherein the second sub-data stream belongs to the data stream, wherein, when the second sub-data stream and the first sub-data stream are a same sub-data stream, the first parameter is the first data calculation result generated by the first circuit, and wherein, when the second sub-data stream and the first sub-data stream are two different sub-data streams, the first parameter is zero;

performing, by the second circuit according to a second scrambling factor, feedback calculation on feedback data provided by the third circuit, and obtaining a feedback calculation result generated by the second circuit, wherein multiple data blocks in the second sub-data stream are obtained by the multiple circuits in one clock cycle, wherein a last data block of the multiple data blocks in the second sub-data stream is obtained by the third circuit, wherein the last data block is the last data block that is transmitted during serial transmission of the multiple data blocks, wherein the second scrambling factor is determined by the scrambling polynomial according to a location of the second data block in the second sub-data stream, wherein the feedback data comprises: data obtained after scrambled data generated by the third circuit is registered for one clock cycle, or a result obtained after an exclusive OR calculation is performed on a first result and a third data calculation result that is generated by the third circuit, and wherein the first result is obtained after feedback calculation is performed on the feedback data that is provided by the third circuit and that is registered for one clock cycle;

performing, by the second circuit, an exclusive OR calculation on the second data calculation result generated by the second circuit and the feedback calculation result generated by the second circuit, to obtain scrambled data generated by the second circuit; and outputting, by the second circuit, the scrambled data generated by the second circuit.

2. The method according to claim 1, wherein performing, according to the first scrambling factor, the data calculation on the second data block in the data stream and the first parameter comprises:

multiplying, by the second circuit, a first scrambling parametric value in the first scrambling factor by the first parameter, to obtain a first multiplication result generated by the second circuit;

multiplying, by the second circuit, a second scrambling parametric value in the first scrambling factor by the second data block, to obtain a second multiplication result generated by the second circuit; and performing, by the second circuit, an exclusive OR calculation on the first multiplication result and the second multiplication result, to obtain the second data calculation result generated by the second circuit.

3. The method according to claim 1, wherein performing the feedback calculation on the feedback data provided by the third circuit comprises:

performing, by the second circuit according to a constant matrix in the second scrambling factor and a power exponent of the constant matrix, an exclusive OR calculation on the feedback data provided by the third circuit, to obtain an exclusive OR result generated by the second circuit, wherein the power exponent is determined according to the location of the second data block in the second sub-data stream; and performing, by the second circuit, a shift operation on the exclusive OR result according to the location of the second data block in the second sub-data stream, to obtain the feedback calculation result generated by the second circuit.

4. The method according to claim 1, wherein performing, according to the first scrambling factor, the data calculation on the second data block in the data stream and the first parameter comprises:

obtaining the second data calculation result generated by the second circuit according to:

$$D_{n,j}' = M \times N_{j-1} + F \times D_{n,j},$$

wherein each data block in the data stream has n bits, the second data block is the $j^{th}$ data block in the data stream, and the first data block is the $j-1^{th}$ data block in the data stream, $D_{n,j}'$ is the second data calculation result generated by the second circuit, $D_{n,j}$ is the second data block, $N_{j-1}$ is the first parameter, M is a first scrambling parametric value in the first scrambling factor, and F is a second scrambling parametric value in the first scrambling factor, wherein:

$$N_{j-1} = \sum_{i=1}^{j-2} M^{j-1-i} \times F \times D_{n,i},$$

$$A = \begin{bmatrix} 0 & 1 & & & & & & 0 \\ 0 & 0 & \ddots & 0 & & & & \\ \vdots & & \ddots & 1 & 0 & & & \\ 0 & & & 0 & 1 & 0 & & \\ 0 & & & & 0 & 1 & \ddots & \\ 0 & & & & & 0 & \ddots & 0 \\ \vdots & & & & & \vdots & \ddots & 1 & 0 \\ 0 & 0 & \ldots & 0 & 0 & 0 & \ldots & 0 & 1 \\ 1 & 0 & \ldots & 0 & 1 & 0 & \ldots & 0 & 0 \end{bmatrix},$$

$$P_{next} = A \times P_{curr} + B \times d_i,$$

$$\tilde{d}_i = C \times P_{curr} + d_i,$$

wherein $P_{next}$ is a status value of a status register in the apparatus in a next clock cycle, $P_{curr}$ is a status value of the status register in a current clock cycle, $\tilde{d}_i$ is scrambled data corresponding to $d_i$ in the data stream, $D_{n,i}$ is a data block, $B=[0 \ldots 0\ 1']$, $C=[1\ 0 \ldots 0\ 1\ 0 \ldots 0]$, and $d_i$ is the $i^{th}$ bit in the data stream, wherein $$H = \begin{bmatrix} CA^{n-1} \\ \vdots \\ CA \\ C \end{bmatrix},$$

$$F = \begin{bmatrix} 1 & CB & CAB & \ldots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix},$$

and $M = H \times J$, and wherein J is an order-reversing calculation parametric value;

wherein performing the feedback calculation on the feedback data provided by the third circuit comprises calculating the feedback calculation result generated by the second circuit according to:

$$D_{n,j}{''} = M^j \times \tilde{D}_{pre},$$

wherein $D_{n,j}{''}$ is the feedback calculation result generated by the second circuit, $\tilde{D}_{pre}$ is the scrambled data generated by the third circuit, and $M^j$ is a third scrambling parametric value in the second scrambling factor; and wherein performing, by the second circuit, the exclusive OR calculation on the second data calculation result generated by the second circuit and the feedback calculation result generated by the second circuit comprises determining the scrambled data generated by the second circuit according to:

$$\tilde{D}_{n,j} = D_{n,j}{''} + D_{n,j}{'},$$

wherein $\tilde{D}_{n,j}$ is the scrambled data generated by the second circuit, $D_{n,j}{'}$ is the second data calculation result generated by the second circuit, and $D_{n,j}{''}$ is the feedback calculation result generated by the second circuit.

5. The method according to claim 1, wherein performing, according to the first scrambling factor, the data calculation on the second data block in the data stream and the first parameter comprises performing, according to the first scrambling factor, the data calculation on the second data block in the data stream and the first parameter according to:

$$V_{n,j}' = \sum_{i=1}^{j} A_n^{j-i} \times G \times D_{n,i},$$

wherein each data block in the data stream has n bits, the second data block is the $j^{th}$ to data block in the data stream, and the first data block is the $j-1^{th}$ data block in the data stream, $V_{n,j}' = T^{-1} \times D_{n,j}'$, $D_{n,j}'$ is the second data calculation result generated by the second circuit, $D_{n,i}$ is a data block in the second sub-data stream, $G = T^{-1} \times F$, and F is a second scrambling parametric value in the first scrambling factor, $$P_{next} = A \times P_{curr} + B \times d_i,$$

$$\tilde{d}_i = C \times P_{curr} + d_i,$$

$$A = \begin{bmatrix} 0 & 1 & & & & & & & 0 \\ 0 & 0 & \ddots & 0 & & & & & \\ \vdots & & \ddots & 1 & 0 & & & & \\ 0 & & & 0 & 1 & 0 & & & \\ 0 & & & & 0 & 1 & \ddots & & \\ 0 & & & & & 0 & \ddots & 0 & \\ \vdots & & & & \vdots & & \ddots & 1 & 0 \\ 0 & 0 & \ldots & 0 & 0 & 0 & \ldots & 0 & 1 \\ 1 & 0 & \ldots & 0 & 1 & 0 & \ldots & 0 & 0 \end{bmatrix},$$

wherein $P_{next}$ is a status value of a status register in the apparatus in a next clock cycle, $P_{curr}$ is a status value of the status register in a current clock cycle, $\tilde{d}_i$ is scrambled data corresponding to $d_i$ in the data stream, $B=[0 \ldots 0\ 1']$, $C=[1\ 0 \ldots 0\ 0\ 0 \ldots 0]$, and $d_i$ is the $i^{th}$ bit in the data stream, $$A_n = T^{-1} \times M \times T,$$

$$A_n = \begin{bmatrix} A_{m \times m} & O \\ O & O_{(n-m) \times (n-m)} \end{bmatrix},$$

$$M = \begin{bmatrix} M_m & O \\ M_t & O \end{bmatrix},$$

t satisfies a relationship: $t = n - m$,
m is an order of A, $$T = \begin{bmatrix} T_m & T_a \\ T_b & I_b \end{bmatrix},$$

$b = [1\ 0 \ldots 0]^T$, $T_m = (W_m^{-1})^T$, $W_m = [b\ M_m^T \cdot b \ \ldots \ (M_m^T)^{m-1} \cdot b]$, $T_b = M_t \times M_m^{-1} \times T_m$, and $T_a = O_{m \times b}$, $T_b = M_t \times M_m^{-1} \times T_m$ and $T_a = O_{m \times b}$, $I_b$ is a $b^{th}$-order unit matrix, $$H = \begin{bmatrix} CA^{n-1} \\ \vdots \\ CA \\ C \end{bmatrix},$$

$$F = \begin{bmatrix} 1 & CB & CAB & \ldots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix},$$

$M = H \times J$, and wherein J is an order-reversing calculation parametric value;

wherein performing the feedback calculation on the feedback data provided by the third circuit comprises performing the feedback calculation on the feedback data provided by the third circuit according to:

$V_{n,j}''=A_n^j \times \tilde{V}_{pre}$, wherein $V_{n,j}''=T^{-1} \times D_{n,j}''$, $D_{n,j}''$ is the feedback calculation result generated by the second circuit, $\tilde{V}_{pre}=T^{-1} \times \tilde{D}_{pre}$, $\tilde{D}_{pre}$ is the scrambled data generated by the third circuit, and $A_n^j$ is a fourth scrambling parametric value in the second scrambling factor; and wherein performing the exclusive OR calculation on the second data calculation result generated by the second circuit and the feedback calculation result generated by the second circuit comprises performing the exclusive OR calculation on the second data calculation result generated by the second circuit and the feedback calculation result generated by the second circuit according to:

$\tilde{V}_{n,j}=V_{n,j}''+V_{n,j}'$, wherein $\tilde{V}_{n,j}=T^{-1} \times D_{n,j}$, $V_{n,j}'=T^{-1} \times \tilde{D}_{n,j}$, $V_{n,j}''=T^{-1} \times D_{n,j}''$, $\tilde{D}_{n,j}$ is the scrambled data generated by the second circuit, $D_{n,j}'$ is the second data calculation result generated by the second circuit, and $D_{n,j}''$ is the feedback calculation result generated by the second circuit.

6. The method according to claim 1, wherein the feedback data comprises the data obtained after the scrambled data generated by the third circuit is registered for one clock cycle.

7. The method according to claim 1, wherein the feedback data comprises the result obtained after the exclusive OR calculation is performed on the first result and the third data calculation result that is generated by the third circuit.

8. The method according to claim 1, wherein the feedback data comprises the data obtained after the scrambled data generated by the third circuit is registered for one clock cycle, and the result obtained after the exclusive OR calculation is performed on the first result and the third data calculation result that is generated by the third circuit.

9. An apparatus comprising:
multiple circuits, comprising a first circuit, a second circuit, and a third circuit;
a switch; and
a receiver, configured to receive a data stream;
wherein the first circuit is configured to perform data calculation on a first data block according to a first scrambling factor, to obtain a first data calculation result generated by the first circuit, wherein the first scrambling factor is determined by a scrambling polynomial, wherein the first data block belongs to a first sub-data stream, and wherein the first sub-data stream belongs to the data stream; and
wherein the switch is configured to, in response to a second data block of the data stream belonging to a same sub-data stream as the first data block, send the first data calculation result generated by the first circuit to the second circuit, wherein the second data block is located after the first data block and is adjacent to the first data block in the data stream during serial transmission;
wherein the second circuit is configured to:
perform, according to the first scrambling factor and a first parameter, data calculation on the second data block in the data stream, to obtain a second data calculation result generated by the second circuit, wherein the second data block belongs to a second sub-data stream, wherein the second sub-data stream belongs to the data stream, wherein, when the second sub-data stream and the first sub-data stream are a same sub-data stream, the first parameter is the first data calculation result generated by the first circuit, and wherein when the second sub-data stream and the first sub-data stream are two different sub-data streams, the first parameter is zero;
perform, according to a second scrambling factor, feedback calculation on feedback data provided by the third circuit, to obtain a feedback calculation result generated by the second circuit, wherein multiple data blocks in the second sub-data stream are obtained by the multiple circuits in one clock cycle, wherein a last data block of the multiple data blocks in the second sub-data stream is obtained by the third circuit, wherein the last data block is the last data block that is transmitted during serial transmission of the multiple data blocks, wherein the second scrambling factor is determined by the scrambling polynomial and a location of the second data block in the second sub-data stream, and the feedback data comprises: data that is obtained after scrambled data generated by the third circuit is registered for one clock cycle, or a result that is obtained after exclusive OR calculation is performed on a first result and a third data calculation result that is generated by the third circuit, wherein the first result is obtained after feedback calculation is performed on feedback data that is provided by the third circuit and that is registered for one clock cycle;
perform an exclusive OR calculation on the second data calculation result generated by the second circuit and the feedback calculation result generated by the second circuit, to obtain scrambled data generated by the second circuit; and
output the scrambled data generated by the second circuit.

10. The apparatus according to claim 9, wherein the second circuit is configured to:
multiply a first scrambling parametric value in the first scrambling factor by the first parameter, to obtain a first multiplication result generated by the second circuit;
multiply a second scrambling parametric value in the first scrambling factor by the second data block, to obtain a second multiplication result generated by the second circuit; and
perform an exclusive OR calculation on the first multiplication result and the second multiplication result, to obtain the second data calculation result generated by the second circuit.

11. The apparatus according to claim 9, wherein the second circuit is configured to:
perform, according to a constant matrix in the second scrambling factor and a power exponent of the constant matrix, an exclusive OR calculation on the feedback data provided by the third circuit, to obtain an exclusive OR result generated by the second circuit, wherein the power exponent is determined according to the location of the second data block in the second sub-data stream; and
perform a shift operation on the exclusive OR result according to the location of the second data block in the second sub-data stream, to obtain the feedback calculation result generated by the second circuit.

12. The apparatus according to claim 9, wherein the second circuit is configured to obtain the second data calculation result according to:

$$D_{n,j}'=M \times N_{j-1}+F \times D_{n,j},$$

wherein each data block in the data stream has n bits, the second data block is the $j^{th}$ to data block in the data stream, and the first data block is the $j-1^{th}$ data block in the data stream, $D_{n,j}'$ is the second data calculation result generated by the second circuit, $D_{n,j}$ is the second data block, $N_{j-1}$ is the first parameter, M is a first scrambling parametric value in the first scrambling factor, and F is a second scrambling parametric value in the first scrambling factor, wherein $$N_{j-1} = \sum_{i=1}^{j-2} M^{j-1-i} \times F \times D_{n,i},$$

$$A = \begin{bmatrix} 0 & 1 & & & & & & & 0 \\ 0 & 0 & \ddots & 0 & & & & & \\ \vdots & & \ddots & 1 & 0 & & & & \\ 0 & & & 0 & 1 & 0 & & & \\ 0 & & & & 0 & 1 & \ddots & & \\ 0 & & & & & 0 & \ddots & 0 & \\ \vdots & & & & & \vdots & \ddots & 1 & 0 \\ 0 & 0 & \ldots & 0 & 0 & 0 & \ldots & 0 & 1 \\ 1 & 0 & \ldots & 0 & 1 & 0 & \ldots & 0 & 0 \end{bmatrix},$$

$$P_{next} = A \times P_{curr} + B \times d_i,$$

$$\tilde{d}_i = C \times P_{curr} + d_i,$$

wherein $P_{next}$ is a status value of a status register in the apparatus in a next clock cycle, $P_{curr}$ is a status value of the status register in a current clock cycle, $D_{n,i}$ is a data block, $B=[0 \ldots 0 \ 1]'$, $C=[1 \ 0 \ldots 0 \ \overline{1} \ 0 \ldots 0]$, $\tilde{d}_i$ is scrambled data corresponding to $d_i$ in the data stream, and $d_i$ is the $i^{th}$ bit in the data stream, wherein $$H = \begin{bmatrix} CA^{n-1} \\ \vdots \\ CA \\ C \end{bmatrix},$$

$$F = \begin{bmatrix} 1 & CB & CAB & \ldots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix},$$

and

M=H×J, and wherein J is an order-reversing calculation parametric value;

wherein the second circuit is configured to perform feedback calculation on feedback data provided by the third circuit by calculating the feedback calculation result generated by the second circuit according to:

$$D_{n,j}''=M^j \times \tilde{D}_{pre},$$

wherein $D_{n,j}''$ is the feedback calculation result, $\tilde{D}_{pre}$ is the scrambled data generated by the third circuit, and $M^j$ is a third scrambling parametric value in the second scrambling factor; and wherein the second circuit is configured to perform the exclusive OR calculation on the second data calculation result generated by the second circuit and the feedback calculation result generated by the second circuit by determining the scrambled data generated by the second circuit according to:

$$\tilde{D}_{n,j}=D_{n,j}''+D_{n,j}',$$

wherein $\tilde{D}_{n,j}$ is the scrambled data generated by the second circuit, $D_{n,j}'$ is the second data calculation result generated by the second circuit, and $D_{n,j}''$ is the feedback calculation result generated by the second circuit.

13. The apparatus according to claim 9, wherein the second circuit is configured to perform, according to the first scrambling factor, the data calculation on the second data block in the data stream and the first parameter according to:

$$V_{n,j}' = \sum_{i=1}^{j} A_n^{j-i} \times G \times D_{n,i},$$

wherein each data block in the data stream has n bits, the second data block is the $j^{th}$ to data block in the data stream, and the first data block is the $j-1^{th}$ data block in the data stream, $V_{n,j}'=T^{-1} \times D_{n,j}'$, $D_{n,j}'$ is the second data calculation result generated by the second circuit, $D_{n,i}$ is a data block in the second sub-data stream, $G=T^{-1} \times F$, and F is a second scrambling parametric value in the first scrambling factor, $$P_{next} = A \times P_{curr} + B \times d_i,$$

$$\tilde{d}_i = C \times P_{curr} + d_i,$$

$$A = \begin{bmatrix} 0 & 1 & & & & & & & 0 \\ 0 & 0 & \ddots & 0 & & & & & \\ \vdots & & \ddots & 1 & 0 & & & & \\ 0 & & & 0 & 1 & 0 & & & \\ 0 & & & & 0 & 1 & \ddots & & \\ 0 & & & & & 0 & \ddots & 0 & \\ \vdots & & & & & \vdots & \ddots & 1 & 0 \\ 0 & 0 & \ldots & 0 & 0 & 0 & \ldots & 0 & 1 \\ 1 & 0 & \ldots & 0 & 1 & 0 & \ldots & 0 & 0 \end{bmatrix},$$

wherein $P_{next}$ is a status value of a status register in the apparatus in a next clock cycle, $P_{curr}$ is a status value of the status register in a current clock cycle, $\tilde{d}_i$ is scrambled data corresponding to $d_i$ in the data stream, $B=[0 \ldots 0 \ 1]'$, $C=[1 \ 0 \ldots 0 \ \overline{1} \ 0 \ldots 0]$, and $d_i$ is the $i^{th}$ bit in the data stream, $$A_n = T^{-1} \times M \times T,$$

$$A_n = \begin{bmatrix} A_{m \times m} & O \\ O & O_{(n-m) \times (n-m)} \end{bmatrix},$$

$$M = \begin{bmatrix} M_m & O \\ M_t & O \end{bmatrix},$$

t satisfies a relationship: t=n−m, m is an order of A, $$T = \begin{bmatrix} T_m & T_a \\ T_b & I_b \end{bmatrix},$$

$b=[1\ 0\ \ldots\ 0]^T, T_m=(W_m^{-1})^T,$ $W_m=[b\ M_m^T \cdot b(M_m^T)^{m-1} \cdot b],$ $T_b=M_t \times M_m^{-1} \times T_m$, and $T_a=O_{m \times b}$, $I_b$ is a $b^{th}$-order unit matrix, $$H = \begin{bmatrix} CA^{n-1} \\ \vdots \\ CA \\ C \end{bmatrix},$$

$$F = \begin{bmatrix} 1 & CB & CAB & \ldots & CA^{n-2}B \\ 0 & 1 & CB & \ddots & \vdots \\ & 0 & 1 & \ddots & CAB \\ \vdots & & 0 & \ddots & CB \\ 0 & & & & 1 \end{bmatrix},$$

$M=H \times J$, and wherein J is an order-reversing calculation parametric value;

wherein the second circuit is configured to perform the feedback calculation on the feedback data provided by the third circuit according to:

$V_{n,j}''=A_n^j \times \tilde{V}_{pre},$ wherein $V_{n,j}''=T^{-1} \times D_{n,j}''$, $D_{n,j}''$ is the feedback calculation result generated by the second circuit, $\tilde{V}_{pre}=T^{-1} \times \tilde{D}_{pre}$, $\tilde{D}_{pre}$ is the scrambled data generated by the third circuit, and $A_n^j$ is a fourth scrambling parametric value in the second scrambling factor; and wherein the second circuit is configured to perform the exclusive OR calculation on the second data calculation result generated by the second circuit and the feedback calculation result generated by the second circuit according to:

$\tilde{V}_{n,j}=V_{n,j}''+V_{n,j}'$ wherein $\tilde{V}_{n,j}=T^{-1} \times \tilde{D}_{n,j}$, $V_{n,j}'=T^{-1} \times D_{n,j}'$, $V_{n,j}''=T^{-1} \times D_{n,j}''$, $\tilde{D}_{n,j}$ is the scrambled data generated by the second circuit, $D_{n,j}'$ is the second data calculation result generated by the second circuit, and $D_{n,j}''$ is the feedback calculation result generated by the second circuit.

14. The apparatus according to claim 9, wherein the feedback data comprises the data obtained after the scrambled data generated by the third circuit is registered for one clock cycle.

15. The apparatus according to claim 9, wherein the feedback data comprises the result obtained after the exclusive OR calculation is performed on the first result and the third data calculation result that is generated by the third circuit.

16. The apparatus according to claim 9, wherein the feedback data comprises the data obtained after the scrambled data generated by the third circuit is registered for one clock cycle, and the result obtained after the exclusive OR calculation is performed on the first result and the third data calculation result that is generated by the third circuit.

* * * * *

UNITED STATES PATENT AND TRADEMARK OFFICE
CERTIFICATE OF CORRECTION

PATENT NO. : 10,715,360 B2  
APPLICATION NO. : 15/991477  
DATED : July 14, 2020  
INVENTOR(S) : Li Page 1 of 2

It is certified that error appears in the above-identified patent and that said Letters Patent is hereby corrected as shown below:

In Column 40, Line 22, Claim 5, delete "B=[0 . . . 0 1', C=[ 1 0 . . . 0 0 0 . . . 0]" and insert
-- $B = \begin{bmatrix} 0 & \cdots & 0 & 1 \end{bmatrix}'$, $C = \begin{bmatrix} 1 & 0 & \cdots & 0 & 1 & 0 & \cdots & 0 \end{bmatrix}$ --.

In Column 40, Lines 41-50, Claim 5, delete
" $b = \begin{bmatrix} 1 & 0 & \cdots & 0 \end{bmatrix}^T$, $T_m = (W_m^{-1})^T$, $W_m = \begin{bmatrix} b & M_m^T \cdot b & \cdots & (M_m^T)^{m-1} \cdot b \end{bmatrix}$, $T_b = M_t \times M_m^{-1} \times T_m$, and $T_a = O_{m \times b}$, $T_b = M_t \times M_m^{-1} \times T_m$, and $T_a = O_{m \times b}$, $I_b$ is a $b^{th}$-order unit matrix," " and insert -- $b = \begin{bmatrix} 1 & 0 & \cdots & 0 \end{bmatrix}^T$, $T_m = (W_m^{-1})^T$, $W_m = \begin{bmatrix} b & M_m^T \cdot b & \cdots & (M_m^T)^{m-1} \cdot b \end{bmatrix}$, $T_b = M_t \times M_m^{-1} \times T_m$, and $T_a = O_{m \times b}$, $I_b$ is a $b^{th}$-order unit matrix, --.

In Column 41, Lines 24-25, Claim 5, delete
"wherein $\tilde{V}_{n,j} = T^{-1} \times D_{n,j}$, $V_{n,j}' = T^{-1} \times \tilde{D}_{n,j}$, $V_{n,j}'' = T^{-1} \times D_{n,j}''$, $\tilde{D}_{n,j}$" and insert
-- wherein $\tilde{V}_{n,j} = T^{-1} \times \tilde{D}_{n,j}$, $V_{n,j}' = T^{-1} \times D_{n,j}'$, $V_{n,j}'' = T^{-1} \times D_{n,j}''$, $\tilde{D}_{n,j}$ --.

Signed and Sealed this  
Fifth Day of January, 2021

Andrei Iancu  
*Director of the United States Patent and Trademark Office*

CERTIFICATE OF CORRECTION (continued)
U.S. Pat. No. 10,715,360 B2

In Column 43, Line 41, Claim 12, delete "$B=[0 \ldots 0\ 1', C=[1\ 0\ \cdots\ 0\ 1\ 0\ \cdots\ 0], \tilde{d}_i$" and insert -- $B=[0\ \cdots\ 0\ 1]', C=[1\ 0\ \cdots\ 0\ 1\ 0\ \cdots\ 0], \tilde{d}_i$ --.

In Column 44, Line 56, Claim 13, delete "$B=[0 \ldots 0\ 1', C=[1\ 0\ \cdots\ 0\ 1\ 0\ \cdots\ 0],$" and insert -- $B=[0\ \cdots\ 0\ 1]', C=[1\ 0\ \cdots\ 0\ 1\ 0\ \cdots\ 0]$ --.

In Column 45, Line 10, Claim 13, delete "$W_m=[b\ M_m^T \cdot b\ (M_m^T)^{m-1} \cdot b]$" and insert -- $W_m = \left[ b\quad M_m^T \cdot b\quad \cdots\quad \left(M_m^T\right)^{m-1} \cdot b \right]$ --.